US012568136B2

(12) United States Patent
Dangi et al.

(10) Patent No.: US 12,568,136 B2
(45) Date of Patent: Mar. 3, 2026

(54) NETWORK BANDWIDTH-AWARE PROCESS SCHEDULING IN DATA CENTERS

(71) Applicant: NVIDIA Corporation, Santa Clara, CA (US)

(72) Inventors: Yogesh Dangi, Pune (IN); Manas Ranjan Jagadev, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 18/421,916

(22) Filed: Jan. 24, 2024

(65) Prior Publication Data

US 2025/0240344 A1      Jul. 24, 2025

(51) Int. Cl.
*H04L 67/101* (2022.01)
*H04L 43/0882* (2022.01)

(52) U.S. Cl.
CPC ........ *H04L 67/101* (2013.01); *H04L 43/0882* (2013.01)

(58) Field of Classification Search
CPC ... H04L 67/101; H04L 43/0882; H04L 67/01; H04L 67/1008; H04L 67/1012; H04L 43/08; H04L 43/16; H04L 43/20
See application file for complete search history.

(56) References Cited

U.S. PATENT DOCUMENTS

| | | | | |
|---|---|---|---|---|
| 2007/0271560 A1* | 11/2007 | Wahlert | ................. | G06F 9/455 |
| | | | | 718/1 |
| 2010/0332658 A1* | 12/2010 | Elyashev | ................ | G06F 9/505 |
| | | | | 709/226 |
| 2011/0078679 A1* | 3/2011 | Bozek | ..................... | G06F 9/455 |
| | | | | 718/1 |
| 2011/0239010 A1* | 9/2011 | Jain | ........................ | G06F 1/3209 |
| | | | | 713/310 |
| 2012/0331463 A1* | 12/2012 | Orveillon | ................. | G06F 8/63 |
| | | | | 718/1 |
| 2014/0215076 A1* | 7/2014 | Grothues | ................ | G06F 9/505 |
| | | | | 709/226 |
| 2014/0282520 A1* | 9/2014 | Sabharwal | ............. | G06F 9/455 |
| | | | | 718/1 |
| 2016/0127184 A1* | 5/2016 | Bursell | ............... | H04L 41/0816 |
| | | | | 709/221 |
| 2019/0238411 A1* | 8/2019 | Navasivasakthivelsamy | .............. | |
| | | | | H04L 41/0896 |
| 2021/0028991 A1* | 1/2021 | Nataraj | ................. | H04L 41/145 |
| 2023/0379267 A1* | 11/2023 | Childress | ............. | H04L 47/781 |

* cited by examiner

*Primary Examiner* — Johnny B Aguiar
(74) *Attorney, Agent, or Firm* — Lowenstein Sandler LLP

(57) ABSTRACT

A computing device determines an expected network bandwidth usage value for a set of processes. The computing device further determines an available network bandwidth value for one or more server rack amongst multiple server racks, and selects a first server rack having an available network bandwidth value closest to the expected network bandwidth usage value. The first server rack includes a first set of servers, and the computing device further determines whether a first server of the first set of servers is available. Responsive to determining the first server is available, the computing device assigns the set of processes to the first server.

19 Claims, 16 Drawing Sheets

500

600

```
┌─────────────────────────────────────────────────────────────────────┐
│                      Receive a set of processes 601                   │
└─────────────────────────────────────────────────────────────────────┘
                                    │
                                    ▼
              ╱───────────────────────────────────────────╲
    NO       ╱            Have the set                      ╲       YES
◄───────────      of processes previously been                 ───────────►
              ╲              performed? 602                   ╱
              ╲───────────────────────────────────────────╱
```

┌───────────────────────┐          ┌─────────────────────────────────────────────────┐
│ Obtain an expected     │          │ Obtain one or more historical network bandwidth   │
│ network bandwidth      │          │ usage values corresponding to the set of          │
│ usage value for the set│          │ processes from a data store  604                  │
│ of processes from      │          └─────────────────────────────────────────────────┘
│ metadata associated    │                              │
│ with the set of        │                              ▼
│ processes              │          ┌─────────────────────────────────────────────────┐
│ 603                    │          │ Predict the expected network bandwidth usage      │
└───────────────────────┘          │ value based on the one or more historical         │
                                    │ network bandwidth usage values  605               │
                                    └─────────────────────────────────────────────────┘

┌─────────────────────────────────────────────────────────────────────┐
│ Select a server from a server rack with an available rack network     │
│ bandwidth value closest to the expected network bandwidth usage       │
│ value 606                                                             │
└─────────────────────────────────────────────────────────────────────┘

```
              ╱───────────────────────────────────────────────╲
             ╱            Does the server have                  ╲
    NO           an available power capacity to perform the set of    YES
◄───────────   processes based on the expected power consumption   ───────────►
             ╲                value? 607                          ╱
              ╲───────────────────────────────────────────────╱
```

┌─────────────────────────────────────────────────────────────────────┐
│                 Assign the set of processes to the server 608         │
└─────────────────────────────────────────────────────────────────────┘

┌─────────────────────────────────────────────────────────────────────┐
│ Responsive to performing the set of processes at the server, store an │
│ actual network bandwidth usage value corresponding to the set of      │
│ processes to the data store 609                                       │
└─────────────────────────────────────────────────────────────────────┘

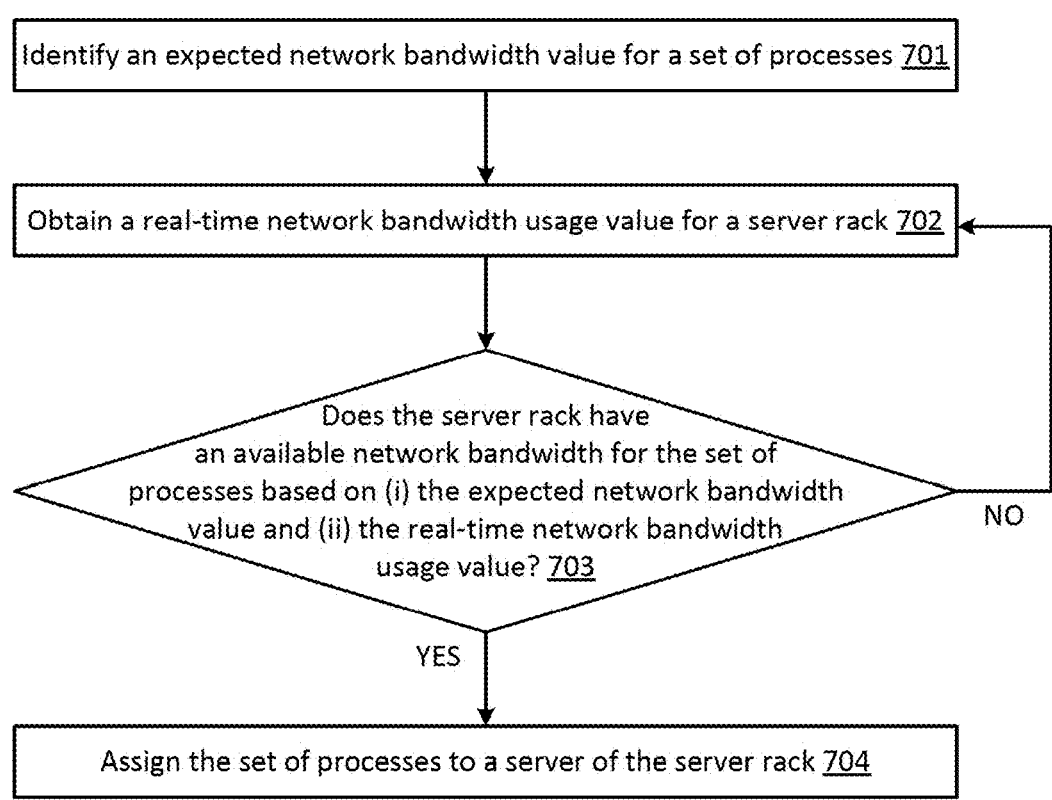

Identify an expected network bandwidth value for a set of processes 701

Obtain a real-time network bandwidth usage value for a server rack 702

Does the server rack have an available network bandwidth for the set of processes based on (i) the expected network bandwidth value and (ii) the real-time network bandwidth usage value? 703

NO

YES

Assign the set of processes to a server of the server rack 704

FIG. 7

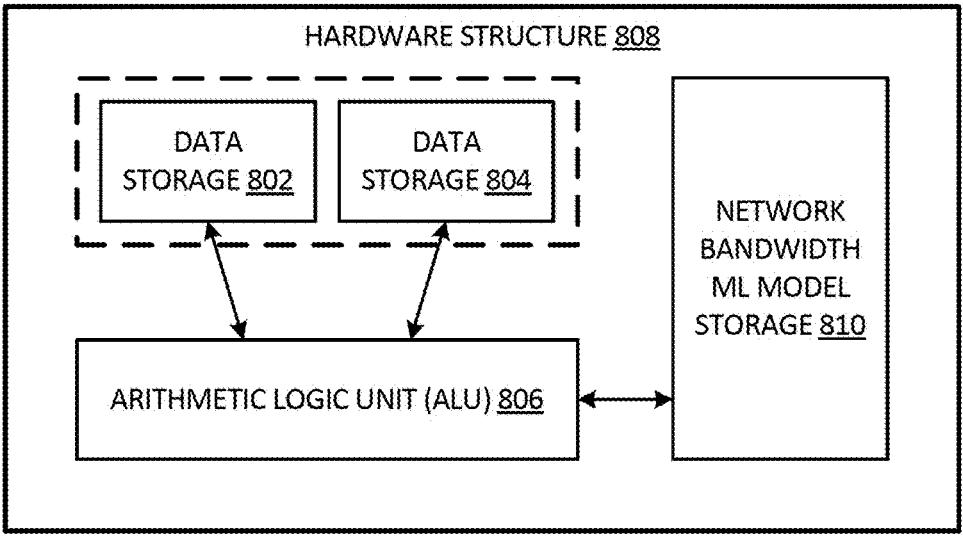
FIG. 8A
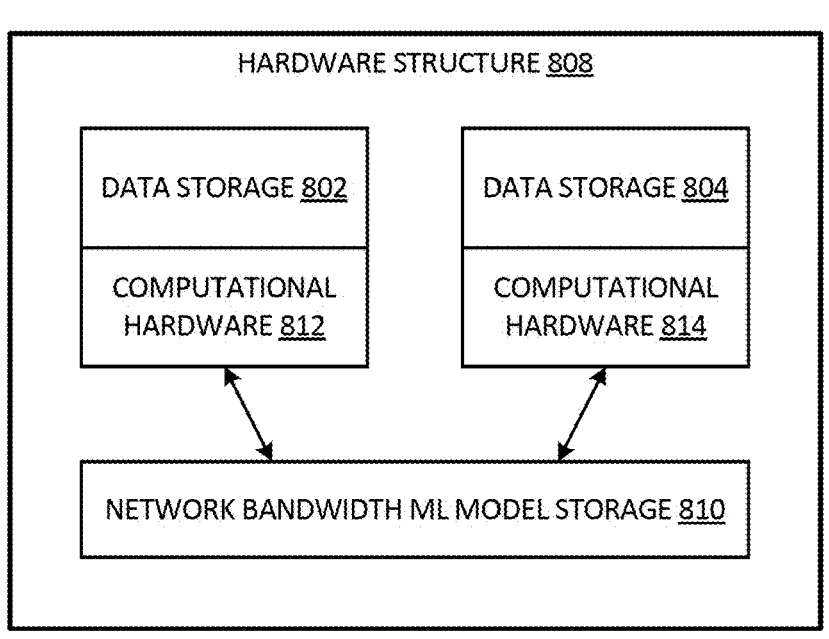
FIG. 8B

900

PROCESSOR 1002

CACHE 1004

REGISTER FILE 1006

EXECUTION UNIT 1008

NETWORK BANDWIDTH-AWARE SCHEDULING INSTRUCTION SET 1009

PROCESSOR BUS 1010

1013

GRAPHICS/VIDEO CARD 1012

MEMORY CONTROLLER HUB (MCH) 1014

1015

MEMORY 1016

INSTRUCTION(S) 1018

DATA 1020

1011

DATA STORAGE 1022

TRANSCEIVER 1024

FIRMWARE HUB 1026

NETWORK CONTROLLER 1028

I/O CONTROLLER HUB (ICH) 1030

LEGACY I/O CONTROLLER 1032

USER INPUT INTERFACE 1034

SERIAL EXPANSION PORT 1036

AUDIO CONTROLLER 1038

1000

1200

NETWORK BANDWIDTH-AWARE PROCESS SCHEDULING IN DATA CENTERS

TECHNICAL FIELD

At least one embodiment pertains to data center process scheduling. For example, at least one embodiment pertains to processors or computing systems used to schedule processes on servers across server racks of a data center.

BACKGROUND

In multi-computing platforms and environments—such as data centers, supercomputers, high-performance computing (HPC) environments, cluster computing environments, or cloud computing environments, etc.—it is important to find idle or underutilized computing devices so that the usages of these computing devices can be more efficiently allocated by taking corrective actions. In the data center or cloud environment, it is important to efficiently use the network bandwidth provided to a server. When network bandwidth is not being used, a data center can be underutilizing the computing resources of servers in the data center.

BRIEF DESCRIPTION OF DRAWINGS

Various embodiments in accordance with the present disclosure will be described with reference to the drawings, in which:

FIG. 6 illustrates a method of network bandwidth-aware scheduling, according to aspects of the disclosure.

FIG. 7 illustrates a method of network bandwidth-aware scheduling, according to aspects of the disclosure.

FIGS. 8A-B illustrate a hardware structure for performing inference and/or training logic, according to aspects of the disclosure.

DETAILED DESCRIPTION

Embodiments described herein are directed to optimizing data center network bandwidth usage with network bandwidth-aware scheduling. A data center can include multiple computing devices. The computing devices can include central processing units (CPUs), graphics processing units (GPUs), data processing units (DPUs), or the like. These computing devices can also be implemented as components in devices referred to as machines, computers, servers, network devices, or the like. These computing devices are important resources in a data center or cloud environment. It is important to have efficient operation of resources in the data center, which can be based on network bandwidth usage and/or efficiency of computing devices in the data center. Optimizing available network bandwidth usage by computing devices—like servers—is a priority in the data center environment. In some systems, computing devices can have a certain unused network bandwidth that is not easily addressable or usable. The unused network bandwidth can represent an inefficiency in the system, and can cause computing devices of the system to be underutilized. In some systems, scheduling jobs can be based on peak network bandwidth usages for a server, which can cause the actual unused network bandwidth to be relatively large.

Aspects and embodiments of the present disclosure address these and other challenges by providing a network bandwidth-aware scheduler for scheduling a set of processes (e.g., applications, jobs, tasks, or routines) received at the data center. By scheduling the set of processes based on an expected network bandwidth usage value (e.g., a mean, median, or mode network bandwidth usage value for the set of processes), network bandwidth provided to a set of servers in a rack can be more fully utilized. This can be achieved by causing the network bandwidth-aware scheduler (e.g., a network bandwidth-aware scheduling module of a scheduler) to schedule a set of processes on a server of a server rack with a network bandwidth closest in value to the expected network bandwidth usage value for the set of processes. Additional details regarding determining how closely the network bandwidth usage value matches an available network bandwidth value of a server rack (or even of a server in a server rack) are described below with reference to FIGS. 2-5. By scheduling a set of processes on server racks with an available network bandwidth value closest to the expected network bandwidth usage value for the set of processes, the scheduler can reduce the amount of unused network bandwidth (e.g., inefficiently used network bandwidth) of server racks of the data center.

Advantages of the disclosure include, but are not limited to, increased network bandwidth efficiency for data centers.

Figure 1A:
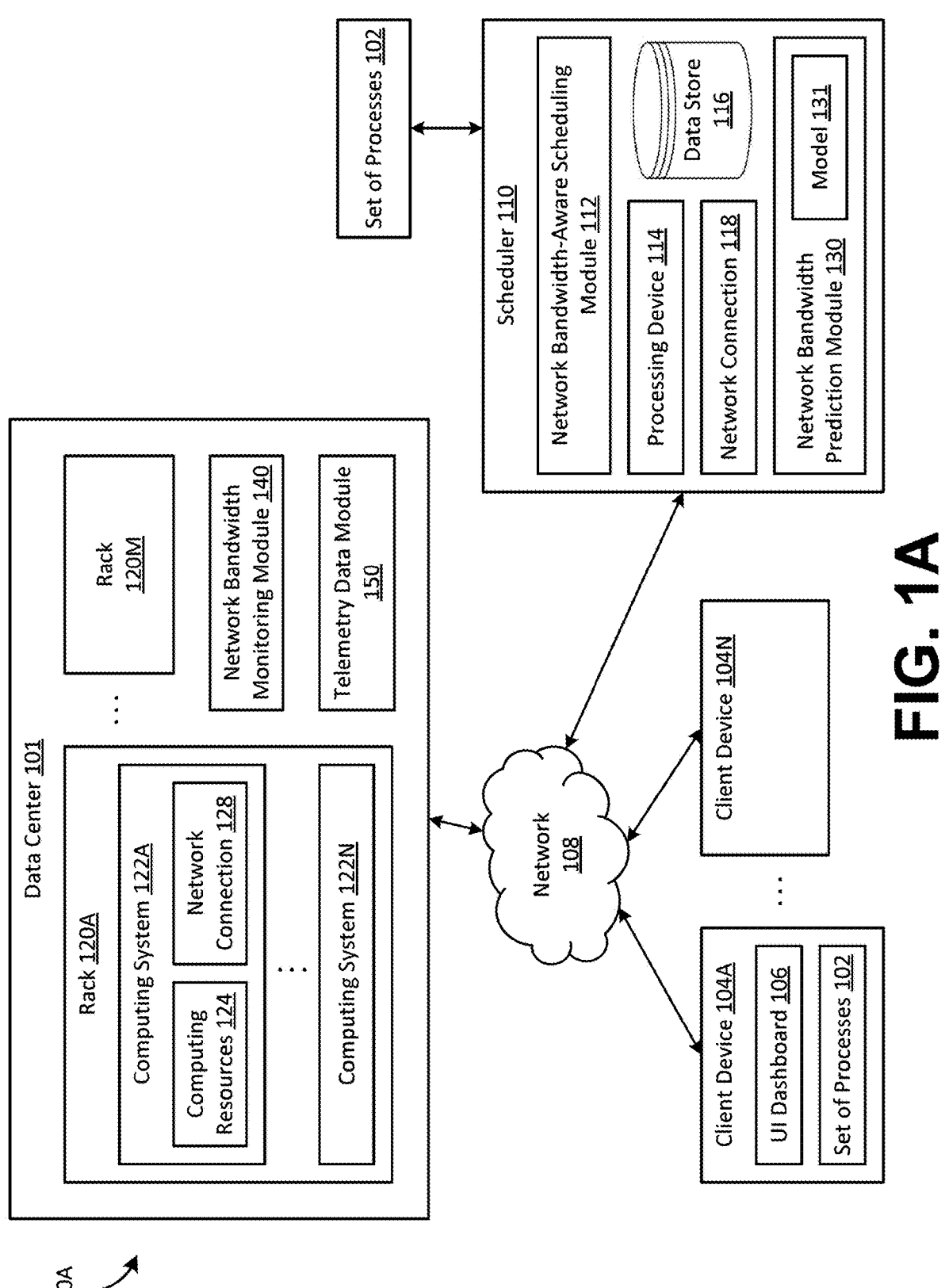
FIG. 1A is a block diagram of a data center environment for implementing network bandwidth-aware scheduling, according to aspects of the disclosure.

FIG. 1A is a block diagram of a data center environment 100A for implementing network bandwidth-aware scheduling, according to aspects of the disclosure. The data center environment 100A includes a data center 101, set of processes 102, scheduler 110, and client devices 104A-N connected by a network 108. As described above, the set of processes 102 can include one or more applications, jobs, tasks, routines, or the like.

In embodiments, the data center 101 can include one or more racks 120A-M, a network bandwidth monitoring module 140, and a telemetry data module 150. In at least one embodiment, the network bandwidth monitoring module 140 can be a part of the telemetry data module 150. In at least one embodiment, the network bandwidth monitoring module 140 can monitor real-time network bandwidth usage values for racks 120A-M of the data center 101. In at least one embodiment, the telemetry data module 150 can obtain information about servers (e.g., computing systems 122A-N) from respective racks (e.g., racks 120A-M), such as hardware usage metrics (e.g., CPU or memory usage percentages) or power consumption values. Each rack 120 can include one or more multiple computing systems 122A-N (herein also referred to as "computing system 122"), where the quantity of racks (M) is a positive integer equal to or greater than zero, and the quantity of computing systems (N) is a second positive integer equal to or greater than zero. In at least one embodiment, each rack 120 can have the same quantity (N) of computing systems 122A-N. That is, in a data center 101, the quantity of computing systems 122A-N can be determined with the equation, X=M*N, where X is the quantity of computing system 122A-N in the data center 101, M is the quantity of racks 120A-M, and N is the quantity of computing systems 122A-N on each rack 120A-M. In embodiments, data center 101 can refer to a physical location. In at least one embodiment, data center 101 can refer to a logical collection of racks 120A-M. In at least one embodiment, data center 101 can include additional components, such as network access components, data center services components, etc. In at least one embodiment, network access and/or data center service components can be included in one or more racks 120A-M and/or one or more computing systems 122A-N of the data center 101.

In embodiments, network 108 can include a public network (e.g., the internet), a private network (e.g., a local area network (LAN) or wide area network (WAN)), a wired network (e.g., Ethernet network), a wireless network (e.g., an 802.11 network or a wireless fidelity (Wi-Fi) network), a cellular network (e.g., a Long Term Evolution (LTE) network), routers, hubs, switches, server computers, and/or a combination thereof.

In embodiments, client devices 104A-N can include a user interface (UI) dashboard 106. In at least one embodiment, client devices 104A-N can generate a set of processes 102 to be received at the scheduler 110 and scheduled on at data center 101 by network bandwidth-aware scheduling module 112. In at least one embodiment, client devices 104A-N can be used to monitor or configure settings of the data center environment 100A (e.g., through UI dashboard 106). In such embodiments, client devices 104A-N can allow users with enhanced privileges with respect to resources of the data center environment 100A access to components of the data center environment 100A (e.g., administrator accounts, etc.). In at least one embodiment, the client devices 104A-N can be used to receive a set of processes 102 from a coupled computing device (e.g., a user device) and forward the set of processes 102 to the scheduler 110. In at least one embodiment, the client devices 104A-N can refer to user devices that generates the request including the set of processes that is received at the scheduler 110.

In embodiments, scheduler 110 includes network bandwidth-aware scheduling module 112, processing device 114, data store 116, and network connection 118. The scheduler

110 includes a processing device 114 that can assign a set of processes to a rack 120 and/or computing system 122 of a rack 120 based on a network bandwidth usage value for the set of processes, as determined by the network bandwidth-aware scheduling module 112. In at least one embodiment, the network bandwidth usage value for the set of processes can be predicted by a model, such as a machine learning (ML) model (e.g., ML model 131 of network bandwidth prediction module 130). In at least one embodiment, the ML model 131 can be a random forest regression model. In at least one embodiment, the ML model 131 can be a support vector machine (SVM) model. In at least one embodiment, the ML model 131 can be other types of ML models that can characterize a network bandwidth usage value for a given set of processes. In at least one embodiment, the ML model 131 can be trained using historical network bandwidth usage values for sets of processes. That is, a set of processes can be assigned an identification value which can correlate to identification values of previously performed similar sets of processes. Additional details regarding predicting the network bandwidth usage value using a ML model 131 are described below with reference to FIGS. 2-3. In at least one embodiment, the network bandwidth usage value can be estimated based on factors associated with the set of processes, such as conditions present in the data center 101, the rack 120, and/or the computing system 122. For example, in at least one embodiment, the set of processes can be received at the network bandwidth-aware scheduling module 112 along with an estimated network bandwidth usage for the set of processes. That is, in at least one embodiment, a system-wide requirement can be imposed to users of client devices 104A-N (herein also referred to as "client device 104") that requires a network bandwidth usage value for the set of processes be submitted alongside the set of processes.

In embodiments, the network bandwidth-aware scheduling module 112 can be coupled to one or more racks 120A-M and/or one or more computing systems 122A-N in the data center 101. Each computing system 122 can include computing resources 124, such as a CPU, a GPU, a DPU, volatile memory and/or nonvolatile memory. Each computing system 122 can include a network connection 128 to communicate with other devices in the data center 101 and/or other devices over the network 108. In at least one embodiment, the network bandwidth-aware scheduling module 112 can be included in the data center 101 (e.g., physically housed in a shared physical location). The network bandwidth-aware scheduling module 112 can be implemented in one of the computing systems 122A-N, or as a standalone computing system in the data center 101. Alternatively, in at least one embodiment, the network bandwidth-aware scheduling module 112 can be external to the data center 101 (e.g., physically housed in a separate location, such as another data center 101 (not illustrated)). In at least one embodiment, the network bandwidth-aware scheduling module 112 can schedule sets of processes to be performed across multiple data centers 101 (not illustrated). In at least one embodiment, the scheduler can have one or more critical backup systems (e.g., backup schedulers) which can be configured to perform the functions of network bandwidth-aware scheduling module 112 if there is an interruption in services from network bandwidth-aware scheduling module 112.

In embodiments, the network bandwidth-aware scheduling module 112 can determine a set of features about a set of processes 102 received at the scheduler 110. For example, and in at least one embodiment the set of features can include the network bandwidth usage value associated with a given set of processes and can retrieve a real-time network bandwidth usage value of a rack 120 and/or computing system 122 (using network bandwidth monitoring module 140). Additional details regarding retrieving real-time network bandwidth usage values is described below with reference to FIGS. 1B-C. The network bandwidth-aware scheduling module 112 can identify the available rack network bandwidth capacity by subtracting the real-time network bandwidth usage of the rack from a maximum network bandwidth value of the rack. For example, if a rack can support 10.0 terabits-per-second (Tbps) (e.g., has a maximum rack network bandwidth value of 10.0 Tbps), and the real-time network bandwidth usage of the rack is 6.0 Tbps, then the available network bandwidth value of the rack would be 10.0 Tbps–6.0 Tbps, or 4.0 Tbps. In at least one embodiment, the network bandwidth-aware scheduling module 112 can collect and store (e.g., in data store 116) or receive these network bandwidth usage and network bandwidth usage values as a table of values. An example table including illustrative entries, Table 1 is illustrated below:

TABLE 1

| Rack Identifier | Max Rack Network bandwidth | Real-Time Rack Network bandwidth Usage | Available Rack Network bandwidth (Max – Usage) | Percentage of Rack Network bandwidth Used |
|---|---|---|---|---|
| Rack(a) | 10.0 Tbps | 2.0 Tbps | 8.0 Tbps | 20% |
| Rack(b) | 10.0 Tbps | 4.0 Tbps | 6.0 Tbps | 40% |
| . . . | . . . | . . . | . . . | . . . |
| Rack(M) | 10.0 Tbps | 9.1 Tbps | 0.9 Tbps | 91% |

In embodiments, the network bandwidth-aware scheduling module 112 can collect network bandwidth usage values for given sets of processes over time, and store collected values in data store 116. In at least one embodiment, network bandwidth usage values can be estimated for a given set of processes based on values of entries in data store 116. Using a processing device (such as processing device 114) the network bandwidth-aware scheduling module 112 can estimate a network bandwidth usage value for a given set of processes and cause the scheduler 110 to schedule the set of processes on a rack 120 having a closest available rack network bandwidth capacity. In at least one embodiment, the network bandwidth-aware scheduling module 112 can send a notification to a user interface (UI) dashboard such as UI dashboard 106 of a client device 104 to indicate when a set of processes have been assigned to a computing system 122. In at least one embodiment, the network bandwidth-aware scheduling module 112 can send a notification to the UI dashboard when the set of processes have been performed. In at least one embodiment, the network bandwidth-aware scheduling module 112 can send a notification to the UI dashboard 106 indicating the computing system 122A-N to which a given set of processes have been assigned.

Data store 116 can be a persistent storage that is capable of storing scheduling information. Scheduling information can include information pertaining to the set of processes 102 such as expected network bandwidth usage values, estimated network bandwidth usage values, actual network bandwidth usage values, historical network bandwidth usage values, computing resource usage requirements (e.g., hardware component usage metrics), duration information, etc. Scheduling information can include information pertaining to the data center 101, such as available rack network bandwidth capacities, available sever network bandwidth capacities, real-time rack network bandwidth usage values, real-time server network bandwidth usage values, maximum available rack network bandwidth values, maximum available server network bandwidth values, etc. Scheduling information can include data structures to tag, organize, and index the scheduling information. Data store 116 can be hosted by one or more storage devices, such as main memory, magnetic or optical storage based disks, tapes or hard drives, network-attached storage (NAS), storage area network (SAN), and so forth. In at least one embodiment, data store 116 can be a network-attached file server, while in other embodiments the data store 116 can be another type of persistent storage such as an object-oriented database, a relational database, and so forth, that can be a separate component of data center environment 100A, or one or more different machines within the data center environment 100A (e.g., such as in data center 101).

In at least one embodiment, the data center environment 100A can include a system with a memory device and a processing device operatively coupled to the memory device. The computing device can include a set of processing units. The computing device can determine an expected network bandwidth usage value for a set of processes. The computing device can determine for racks 120A-N, an available rack network bandwidth capacity. The computing device can select from racks 120A-N, a rack 120 having a closest available rack network bandwidth capacity. The computing device can determine whether a server of the rack 120 is available. Responsive to determining a server of the rack 120 is available, the computing device can assign the set of processes to the server of the rack 120. In at least one embodiment, the system includes one or more of a control system for an autonomous or semi-autonomous machine; a perception system for an autonomous or semi-autonomous machine; a system for performing simulation operations; a system for performing deep learning operations; a system for generating synthetic data; a system for generating multi-dimensional assets using a collaborative content platform; a system implemented using an edge device; a system implemented using a robot; a system incorporating one or more virtual machines (VMs); a system implemented at least partially in a data center; or a system implemented at least partially using cloud computing resources.

In at least one embodiment, the network bandwidth-aware scheduling module 112 can collect and store historical network bandwidth usage values associated with multiple sets of processes in data store 116 to train a ML model 131 to predict a network bandwidth usage value for a newly received set of processes. The ML model 131 can identify various hidden patterns in the historical network bandwidth usage values for respective sets of processes and use a current pattern in newly collected data to determine the network bandwidth usage value for the newly received set of processes. In at least one embodiment, the ML model 131 can be one or more of a logistics regression model, a k-nearest neighbor model, a random forest regression model, a gradient boost model, a support vector machine (SVM) model or an Extreme Gradient Boost (XGBoost) model. Alternatively, other types of ML models can be used. The ML model 131 can be deployed as an object to a component of data center environment 100A (e.g., such as scheduler 110 or network bandwidth-aware scheduling module 112).

In at least one embodiment, the ML model 131 is trained using at least historical network bandwidth usage values for at least one process of the set of processes. In at least one embodiment, the ML model 131 is trained using historical network bandwidth usage values for each process during a first amount of time. The ML model 131 can be used to predict an expected network bandwidth usage value for a set of processes 102 received at the scheduler 110. The ML model 131 can be trained on data associated with one or more previous time periods. The ML model 131 can be deployed as an object to a second computing device operatively coupled to the computing device. Additional details regarding training and using the ML model 131 are described below with reference to FIG. 2, and FIGS. 8A-B.

Figure 1B:
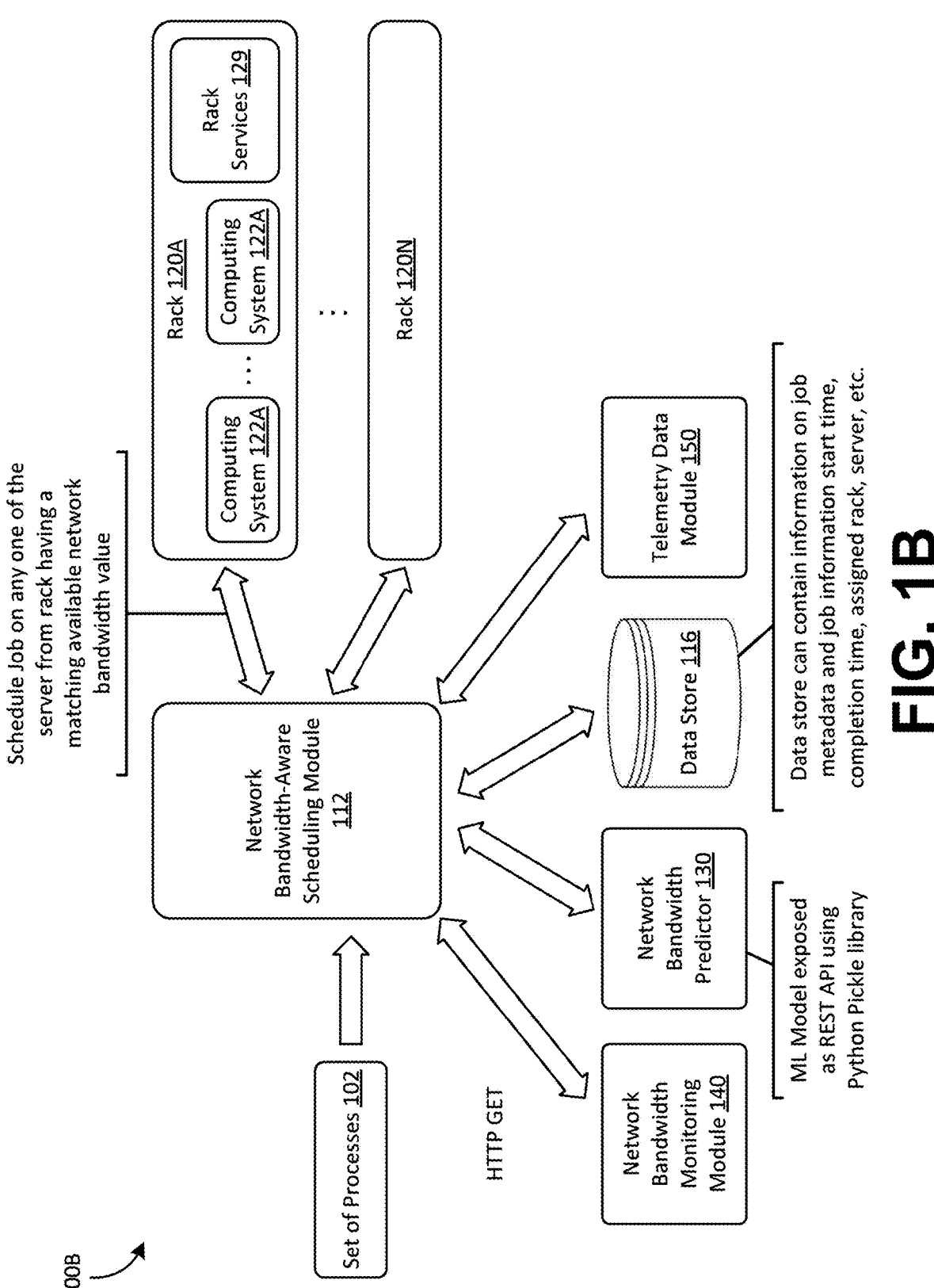
FIG. 1B is a block diagram of a data center environment for implementing network bandwidth-aware scheduling, according to aspects of the disclosure.

FIG. 1B is a block diagram of a data center environment 100B for implementing network bandwidth-aware scheduling, according to aspects of the disclosure. The data center environment 100B includes a set of processes 102, the network bandwidth-aware scheduling module 112, racks 120A-M, the data store 116, the network bandwidth monitoring module 140, the telemetry data module 150, and the network bandwidth prediction module 130. For clarity and brevity, not every component of data center environment 100A is shown and/or described with reference to FIG. 1B. However, it can be appreciated that FIG. 1B includes relevant portions of FIG. 1A, and that insofar as various elements or components are illustrated or described, each component of FIG. 1B retains the same, or a similar structure to the respectively named and numbered component of FIG. 1A. That is, for example, scheduler 110 as illustrated in FIG. 1B can be the same as, or similar to (e.g., perform the functions of) scheduler 110 as illustrated in FIG. 1A.

A set of processes 102 can be received at scheduler 110. Network bandwidth-aware scheduling module 112 can determine a network bandwidth usage value for the set of processes, and using the network bandwidth usage value for the set of processes 102 and respective maximum network bandwidth values for racks 120A-N, assign the set of processes 102 to a computing system 122 of a rack 120. In at least one embodiment, the network bandwidth-aware scheduling module 112 can obtain maximum network bandwidth values for racks 120A-N from network bandwidth monitoring module 140. In at least one embodiment, the network bandwidth-aware scheduling module 112 can communicate with the network bandwidth monitoring module 140 using a HyperText Transfer Protocol (HTTP) Get function. In at least one embodiment, the network bandwidth-aware scheduling module 112 can assign the set of processes 102 to a rack 120. In at least one embodiment, network bandwidth-aware scheduling module 112 can schedule a set of processes (e.g., a "job") on any computing system 122A-N (e.g., "server") of a rack 120 having an available rack network bandwidth value closest to a network bandwidth value associated with the set of processes.

In embodiments, rack services 129 can be implemented on a computing system 122 of rack 120, or as a separate computing device. In at least one embodiment, rack services 129 can include a hardware component that can collect real-time network bandwidth usage values for a rack 120 and/or computing systems 122A-N of a rack 120. By way of non-limiting example, in at least one embodiment, the rack services 129 can be implemented as a service, an agent, or a process within the OS or outside the OS in the kernel space of a processing device in a rack 120, or in scheduler 110 (e.g., such as processing device 114). In at least one embodiment, rack services 129 can perform one or more functions at regular intervals (e.g., report real-time network bandwidth usage values, report real-time usage metrics of hardware components of the server, etc.). In at least one embodiment, rack services 129 can perform one or more functions when triggered, such as when triggered by a network bandwidth-aware scheduling module 112 attempting to schedule a set of processes 102 at a rack 120 and/or computing system 122 of a rack 120.

In embodiments, rack services 129 can receive the set of processes 102 and, based on usage metrics of hardware components associated with respective computing systems 122A-N, assign the set of processes 102 to a computing system 122 (e.g., expected usage metrics for the set of processes 102). In at least one embodiment, usage metrics of hardware components of a server can be referred to as "telemetry data." Additional details regarding telemetry data are described below with reference to FIG. 1D. In at least one embodiment, if rack services 129 is unable to assign the set of processes 102 to a computing system 122A-N, rack services 129 can send the set of processes 102 back to scheduler 110. For example, the set of processes 102 can require more computing resources than are available at any single computing system 122A-N, or the network bandwidth usage value for the set of processes 102 can exceed an available network bandwidth value for the server. In at least one embodiment, telemetry data module 150 can be used to obtain server usage metrics for hardware components of a server. For example, telemetry data module 150 can obtain a CPU usage metric, a GPU usage metric, a DPU usage metric, and/or usage metrics of volatile and/or non-volatile memory devices of a server (e.g., computing system 122A-N). Each usage metric can have a respective maximum usage metric value, such that the usage metric can be expressed as a percentage. In an illustrative example, a maximum usage metric value for a volatile memory device can be 128 gigabytes (GB). If 96 gigabytes of the 128 gigabytes are being used, the usage metric for the illustrative volatile memory device can be expressed as 96/128, or 75%.

In embodiments, rack services 129 can be used by network bandwidth monitoring module 140 to collect and/or report network bandwidth usage values for a rack 120 and/or network bandwidth usage values for respective computing systems 122A-N of the rack 120. In at least one embodiment, rack services 129 can be used by telemetry data module 150 to collect and/or report computing resource usage metrics for a rack 120 and/or computing resource usage metrics of hardware components for respective computing systems 122A-N of the rack 120. Rack services 129 can send network bandwidth usage values and/or computing resource usage metrics that have been collected for a rack 120 to the network bandwidth monitoring module 140 and/or the network bandwidth-aware scheduling module 112 (e.g., to be stored in a data store such as data store 116). In at least one embodiment, rack services 129 can be performed at each rack 120A-M (e.g., as a process on one of computing systems 122A-N). In at least one embodiment, some of the rack services 129 can be performed as a part of a standalone computing system within the data center environment 100B. In at least one embodiment, some of the rack services 129 can be performed by the network bandwidth-aware scheduling module 112 or the scheduler 110. In at least one embodiment, some of the rack services 129 can be performed by the network bandwidth monitoring module 140.

In at least one embodiment, the network bandwidth prediction module 130 and the telemetry data module 150 can be used to obtain and/or generate input for training a ML model 131 to predict expected network bandwidth usage values. In such embodiments, the ML model 131 can be exposed as a Representational State Transfer (REST) Application Programming Interface (API) using the Python pickle library. Additional details regarding training and using the ML model 131 are described with reference to FIGS. 2-3.

In at least one embodiment, network bandwidth-aware scheduling module 112 can schedule a job on any one of the servers from a rack with a matching available network bandwidth value. A matching available network bandwidth value of a server rack is a network bandwidth value for a server rack that is closest in value to the network bandwidth value associated with a set of processes. In an illustrative example, referring to Table 1, Rack(M) has an available network bandwidth of 1 Tbps, and has a network bandwidth usage rate of 90%. A set of processes that has an expected network bandwidth usage value of 0.9 Tbps would be closest to, or "match" the available network bandwidth of Rack(M) in the set of Rack(a) (8 Tbps available), Rack(b) (6 Tbps available), and Rack (M)(1 Tbps available).

In at least one embodiment, data store 116 can contain information associated with a job (e.g., a set of processes 102), such as metadata sent with the job, and job information pertaining to a job, such as a job start time, completion time, assigned rack, assigned server, etc. In at least one embodiment, metadata and job information can be associated with a job identifier (ID) in data store 116, and can be used as information to predict expected network bandwidth usage values for future sets of processes.

Figure 1C:
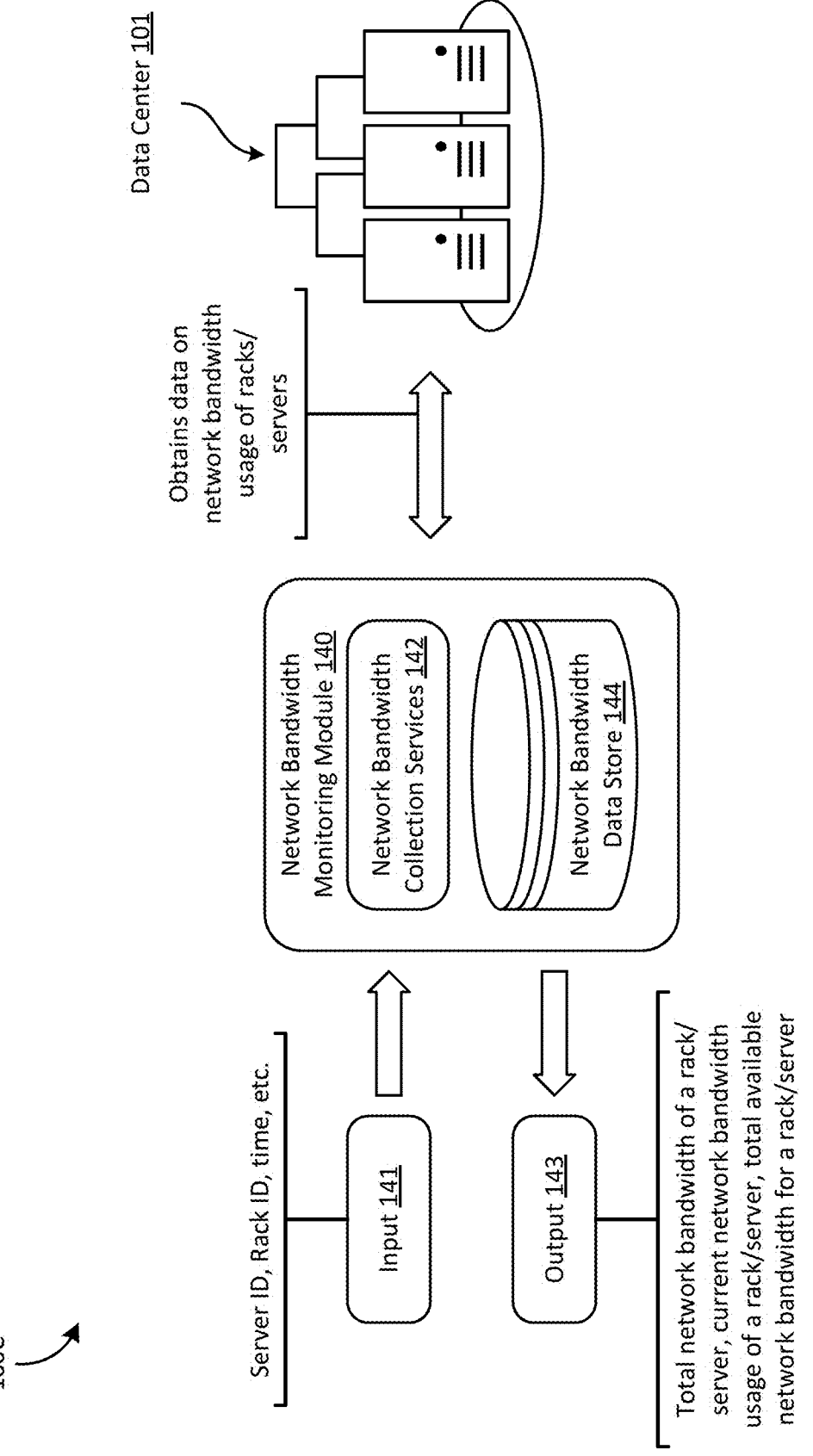
FIG. 1C is a block diagram of a data center environment for implementing network bandwidth-aware scheduling, according to aspects of the disclosure.

FIG. 1C is a block diagram of a data center environment 100C for implementing network bandwidth-aware scheduling, according to aspects of the disclosure. The data center environment 100C includes data center 101, network bandwidth monitoring module 140, input 141, and output 143. For clarity and brevity, not every component of data center environments 100A and 100B are shown and/or described with reference to FIG. 1C. However, it can be appreciated that FIG. 1C includes relevant portions of FIGS. 1A-B, and that insofar as various elements or components are illustrated or described, each component of FIG. 1C retains the same, or similar structure to the respectively named and numbered component of FIGS. 1A-B. That is, for example, network bandwidth monitoring module 140 as illustrated in FIG. 1C can be the same as, or similar to (e.g., perform the functions of) network bandwidth monitoring module 140 as illustrated and described in FIGS. 1A-B.

Network bandwidth monitoring module 140 can include network bandwidth collection services 142, and network bandwidth data store 144. Network bandwidth collection service 142 can collect network bandwidth usage values from devices and/or components of the data center 101, such as a rack 120, or computing system 122 (not illustrated). In at least one embodiment, network bandwidth collection service 142 can collect network bandwidth usage values associated with given sets of processes, and/or historical sets of processes (e.g., sets of processes that have previously been performed). Once network bandwidth collection service 142 has obtained network bandwidth usage values and/or network bandwidth usage values, the collected values can be stored in network bandwidth data store 144. In at least one embodiment, network bandwidth data store 144 can transmit or synchronize the values of stored entries in network bandwidth data store 144 with other data stores in the data center 101 or data center environment 100C (e.g., such as data store 116 as described with respect to FIG. 1A).

The network bandwidth monitoring module 140 can contain information for each rack in data center 101 at any given time (e.g., "real-time" network bandwidth information). In at least one embodiment, the network bandwidth monitoring module 140 can provide an available network bandwidth value for a given rack to the network bandwidth-aware scheduling module 112 of FIGS. 1A-B. In at least one embodiment, the network bandwidth monitoring module 140 can provide rack information collected by network bandwidth collection service 142 and stored in network bandwidth data store 144 through a representational state transfer (REST) application programming interface (API). A REST API (also known as RESTful API) is an API or web interface that allows interaction with RESTful web services. In at least one embodiment, the REST API can be exposed to users (e.g., administrators of the data center 101), where the user can pass feature attributes for a specified period (e.g., an hour/day, etc.) or a specified system (e.g., a server ID, rack ID, etc.) as input 141. The REST API can provide indications of network bandwidth usage values of racks 120A-N, computing systems 122A-N, and/or network bandwidth usage values for a set of processes 102 as an output 143. For example, and in at least one embodiment, outputs 143 can include a total network bandwidth (e.g., a maximum network bandwidth) of a rack or server, a current ("real-time") network bandwidth usage of a rack or server, and an available network bandwidth for a rack or server (e.g., the unused network bandwidth). As described above, aggregated data can be collected (e.g., as an "aggregation"), and used as inputs 141 to the REST API services obtain outputs 143 that can be used to predict a network bandwidth usage value for a set of processes 102 received at a network bandwidth-aware scheduling module 112. In at least one embodiment, information collected, or transmitted using the REST API can be used to provide a visualization of the data center environment 100C to a UI dashboard, such as UI dashboard 106 of FIG. 1A.

In at least one embodiment, network bandwidth data store 144 can be the same as, or similar to data store 116. The network bandwidth monitoring module 140 can aggregate network bandwidth usage and/or network bandwidth usage values for a specified time period and summarize the usage data in a summary table, which can be stored in a data store, such as data store 116 of FIG. 1A. This data can be collected and stored for racks, and for servers. Such summary tables can be provided by the REST API. An exemplary table including illustrative entries, Table 2 is illustrated below:

TABLE 2

| Rack Identifier | Real-Time Network bandwidth Usage | Available Network bandwidth | Percentage of Network bandwidth Used | Rack Timestamp |
|---|---|---|---|---|
| Rack(a) | 2 Tbps | 8 Tbps | 20% | YYYY-MM-DD 23:59:59 |
| . . . | . . . | . . . | . . . | . . . |
| Rack(M) | 9.1 Tbps | .9 Tbps | 91% | YYYY-MM-DD 23:59:59 |

In at least one embodiment, similar data can be collected and reported for servers of the server rack (e.g., computer system 122A-N of racks 120A-M, not illustrated).

Figure 1D:
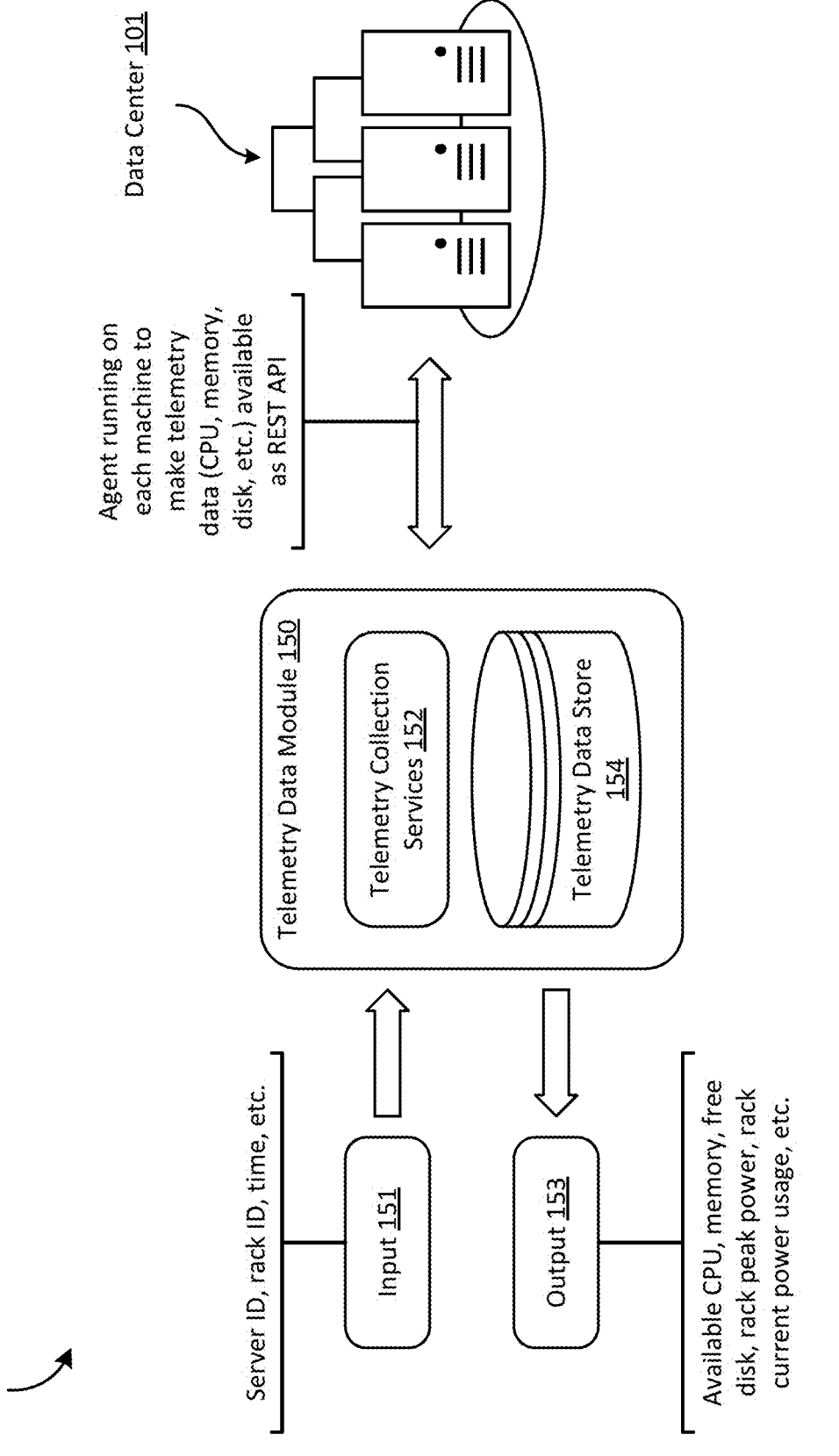
FIG. 1D is a block diagram of a data center environment for implementing network bandwidth-aware scheduling, according to aspects of the disclosure.

FIG. 1D is a block diagram of a data center environment 100D for implementing network bandwidth-aware scheduling, according to aspects of the disclosure. The data center environment 100D includes data center 101, telemetry data module 150, input 151, and output 153. For clarity and brevity, not every component of data center environments 100A and/or 100B are shown and/or described with reference to FIG. 1D. However, it can be appreciated that FIG. 1D includes relevant portions of FIGS. 1A-B, and that insofar as various elements or components are illustrated or described, each component of FIG. 1D retains the same, or similar structure to the respectively named and numbered component of FIGS. 1A-B. That is, for example, telemetry data module 150 as illustrated in FIG. 1D can be the same as, or similar to (e.g., perform the functions of) telemetry data module 150 as illustrated and described in FIGS. 1A-B.

Telemetry data module 150 can include telemetry collection services 152, and telemetry data store 154. Telemetry data module 150 can collect telemetry data from devices and/or components of the data center 101, such as a rack 120 or computing system 122 (not illustrated). In at least one embodiment, telemetry data can include, for example, available CPU resources, available DPU resources, available GPU resources, available volatile memory, available non-volatile memory, server max power, rack max power, server real-time power usage, rack real-time power usage, etc. In at least one embodiment, telemetry collection services 152 can collect telemetry data associated with given sets of processes, and/or historical sets of processes (e.g., sets of processes that have previously been performed). Once telemetry collection services 152 has obtained telemetry values for systems of data center 101, the collected values can be stored in telemetry data store 154. In at least one embodiment, telemetry data store 154 can transmit or synchronize the values of entries stored in telemetry data store 154 to/with other data stores in the data center 101 or data center environment 100D (e.g., such as a data store 116 as described with respect to FIG. 1A).

The telemetry data module 150 can contain telemetry information for each rack in data center 101 at any given time (e.g., "real-time" telemetry data). In at least one embodiment, the telemetry data module 150 can provide an available indication for one or more hardware resources of a given rack to the network bandwidth-aware scheduling module 112 of FIGS. 1A-B. In at least one embodiment, the telemetry data module 150 can provide rack and/or server information collected by telemetry collection service 152 and stored in telemetry data store 154 through a REST API. In at least one embodiment, the REST API can be exposed to users (e.g., administrators of the data center 101), where the user can pass feature attributes for a specified period (e.g., an hour/day, etc.) or a specified system (e.g., a server ID, rack ID, etc.) as input 151. The REST API can provide indications of telemetry data values of racks 120A-N, computing systems 122A-N, and/or telemetry data values for a set of processes 102 as an output 153. For example, and in at least one embodiment, outputs 153 can include a maximum hardware component resource capacity, a current ("real-time") hardware component resource usage, and an availability of hardware component resource. In an illustrative example, regarding a CPU (hardware component of the server), the output 153 can indicate the number of calculations that can be performed by the CPU per second (calculated based on the quantity of CPU cores, and corresponding clock speeds of each of the cores), a real-time CPU usage of 65%, and a CPU availability of 40% (leaving a 5% overhead buffer). Similar telemetry data can be collected and provided by telemetry data module 150 for each hardware component of the server (such as is described above). In at least one embodiment, real-time telemetry data values and other information pertaining to servers in a data center 101 (e.g., computing system 122) can be be obtained using the REST API and/or a rack-to-server mapping table. In at least one embodiment, the rack-to-server mapping table can be stored in telemetry data store 154. An example table including illustrative entries, Table 3, is illustrated below:

TABLE 3

| Rack Identifier | First Server Address | | . . . N-th Server Address |
|---|---|---|---|
| Rack(a) | Server(a)_HOST_IP_(1) | . . . | Server(N)_HOST_IP_(1) |
| . . . | . . . | | . . . |
| Rack(M) | Server(a)_HOST_IP_(M) | . . . | Server(N)_HOST_IP_(M) |

As described above, aggregated data can be collected, and used as inputs 151 to the REST API obtain outputs 153 that can be used to predict a network bandwidth usage value for a set of processes 102 received at a network bandwidth-aware scheduling module 112. In at least one embodiment, information collected, or transmitted using the REST API can be used to provide a visualization of the data center environment 100D to a UI dashboard, such as UI dashboard 106 of FIG. 1A.

Using a rack identifier, the telemetry data module 150 can use, for example, the REST API to retrieve sever information from the identified rack. In an illustrative example, and in at least one embodiment, the following pseudo code can be used in the REST API to collect server information:

```
{
    rack_id:
        {
            {
            "server_ip": "ip_address",
            "hostname": "hostname_of_server",
            "available_cpu": "available_cpu",
            "available_memory": "available_memory",
            },
            {
            "server_ip": "ip_address",
            "hostname": "hostname_of_server",
            "available_cpu": "available_cpu",
            "available_memory": "available_memory",
            },
            {
            "server_ip": "ip_address",
            "hostname": "hostname_of_server",
            "available_cpu": "available_cpu",
            "available_memory": "available_memory",
            }
        }
}
```

In at least one embodiment, telemetry data store 154 can be the same as, or similar to data store 116. The telemetry data module 150 can aggregate network bandwidth usage and/or network bandwidth usage values for a specified time period and summarize the usage data in a summary table, which can be stored in a data store, such as data store 116 of FIG. 1A. This data can be collected and stored for racks, and for servers. Such summary tables can be provided by the REST API. An exemplary table including illustrative entries, Table 4 is illustrated below:

TABLE 4

| Server Identifier | Available CPU Resources | Available Memory | Available Electrical Power | Server Timestamp |
|---|---|---|---|---|
| Server(a) | 30% | 30% | 20% | YYYY-MM-DD 23:59:59 |
| . . . | . . . | . . . | . . . | . . . |
| Server(M) | 10% | 20% | 10% | YYYY-MM-DD 23:59:59 |

In at least one embodiment, similar data can be collected and reported for server racks of a data center (e.g., racks 120A-M, not illustrated). In such embodiments, rack-wide hardware usage data (e.g., telemetry data) can be obtained by summing the values of each server of the server rack and presenting a weighted average. In an illustrative example of a server rack containing server (a) and server (M) of Table 3, the telemetry data of the server rack could be represented as having on average, 20% available CPU resources, 25% available memory, and 15% available power.

In at least one embodiment, telemetry data can be collected by telemetry collection services 152 and stored in telemetry data store 154 by accessing an agent running on each system of the data center. For example, each server (e.g., computing system 122) of data center 101 can include an application that monitors real-time hardware component usage rates for hardware components of the server. In at least one embodiment, each server rack (e.g., rack 120) of data center 101 can include an application that monitors real-time hardware component usage rates for hardware components of all servers in the server rack (e.g., the application can be executed by rack services 129).

Figure 1E:
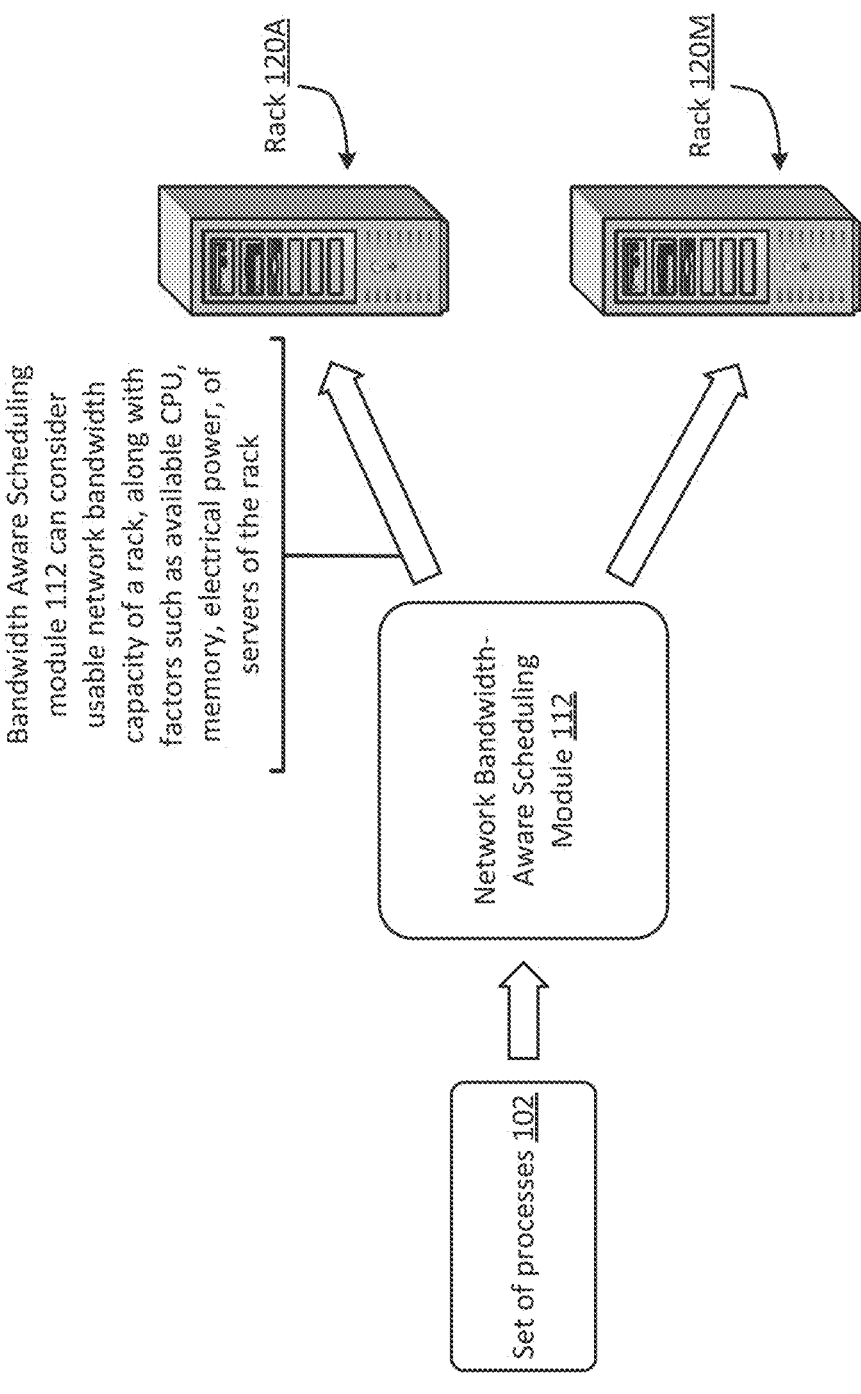
FIG. 1E is a block diagram of a data center environment for implementing network bandwidth-aware scheduling, according to aspects of the disclosure.

FIG. 1E is a block diagram of a data center environment 100E for implementing network bandwidth-aware scheduling, according to aspects of the disclosure. The data center environment 100D includes set of processes 102, network bandwidth-aware scheduling module 112, and racks 120A-N. For clarity and brevity, not every component of data center environments 100A-C are shown and/or described with reference to FIG. 1E. However, it can be appreciated that FIG. 1E includes relevant portions of FIGS. 1A-D, and that insofar as various elements or components are illustrated or described, each component of FIG. 1E retains the same, or similar structure to the respectively named and number component of FIGS. 1A-D. That is, for example, network bandwidth-aware scheduling module 112 can be the same as or similar to (e.g., perform the functions of) network bandwidth-aware scheduling module 112 as illustrated and described in FIGS. 1A-D.

The set of processes 102 can be received at the network bandwidth-aware scheduling module 112. The network bandwidth-aware scheduling module 112 can assign the set of processes to a rack 120A-M based on various factors, such as a rack maximum network bandwidth value, the rack real-time network bandwidth usage, a server maximum network bandwidth value, a server real-time network bandwidth usage, and/or available compute resources on a server of a rack 120A-M (e.g., a computing system 122, not illustrated). For example, compute resources of a server can include a hardware component availability (e.g., represented as a usage metric, or percentage of available CPU, DPU, GPU, memory, etc.) and an electrical power availability. In at least one embodiment, network bandwidth-aware scheduling module can directly assign the set of processes 102 to a server of a rack 120. In at least one embodiment, as described with reference to FIG. 1B, the network bandwidth-aware scheduling module can assign the set of processes 102 to a rack 120, and rack services (e.g., rack services 129, not illustrated) can assign the set of processes 102 to a server (e.g., computing system 122, not illustrated).

In embodiments, the network bandwidth-aware scheduling module 112 can attempt to identify an available server on a rack 120, such as the rack 120 having the closest available network bandwidth value to the expected network bandwidth value for the set of processes. In such embodiments, it is possible that the network bandwidth-aware scheduling module 112 can be unable to find an available server on the rack 120. The network bandwidth-aware scheduling module 112 can then identify (e.g., using network bandwidth monitoring module 140) another rack 120 with a next-closest available network bandwidth capacity (e.g., a second-closest available network bandwidth capacity). In at least one embodiment, upon failing to identify an available server on any of racks 120A-N, network bandwidth-aware scheduling module 112 can place the set of processes 102 in a waiting queue. In at least one embodiment, upon failing to identify an available server on any of racks 120A-N, the network bandwidth-aware scheduling module 112 can request an updated real-time network bandwidth usage value for each of racks 120A-N from the network bandwidth monitoring module 140 (not illustrated).

Figure 2:
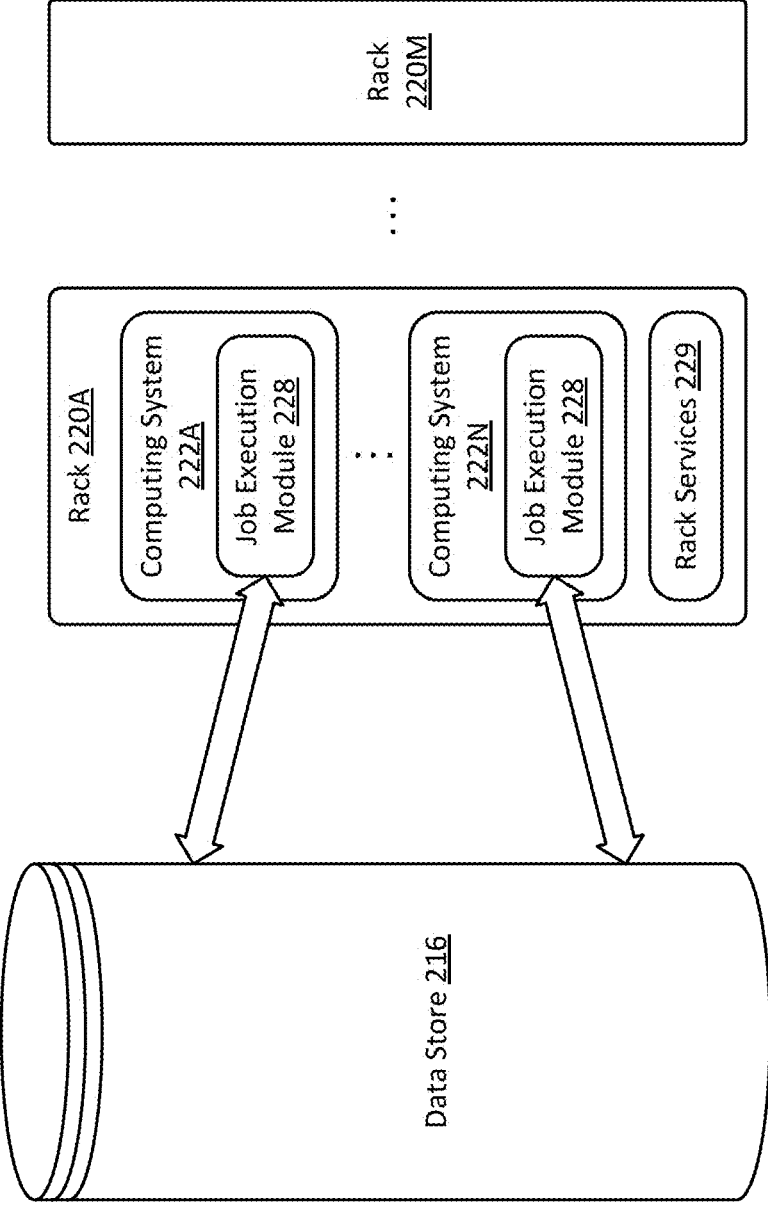
FIG. 2 is a block diagram of a data center with multiple racks, and multiple computing systems on each rack, each computing system containing an agent to collect telemetry data (e.g., hardware component usage data) for the respective computing system, according to aspects of the disclosure.

FIG. 2 is a block diagram of a data center 200 with multiple racks 220A-M, and multiple computing systems 222A-N on each rack 220, each containing an agent to collect telemetry data (e.g., hardware component usage data) for the respective computing system, such as computing system 222. It should be noted that although two server racks, rack 220A and rack 220M, and two servers, computing system 222A and computing system 222N are illustrated, any number of server racks and/or servers can be used. Each computing system 222 can include a job execution module 228 collects telemetry data (as described above) for the computing system 222A with respect to a job executed by the computing system (e.g., a set of processes). Each job execution module 228 can additionally collect temporal information (e.g., timestamp data) and/or electrical power information for the computing system 222 with respect to the job executed by the computing system 222. The data store 216 can be similar to the data store 116 as described with reference to FIG. 1A. In at least one embodiment, the telemetry data can include job identifiers of jobs that caused the obtained telemetry data. In at least one embodiment, rack services 229 can facilitate in collecting and/or sending telemetry data, temporal information, and/or electrical power information for computing systems 222A-N of respective racks, such as racks 220A-M.

Figure 3:
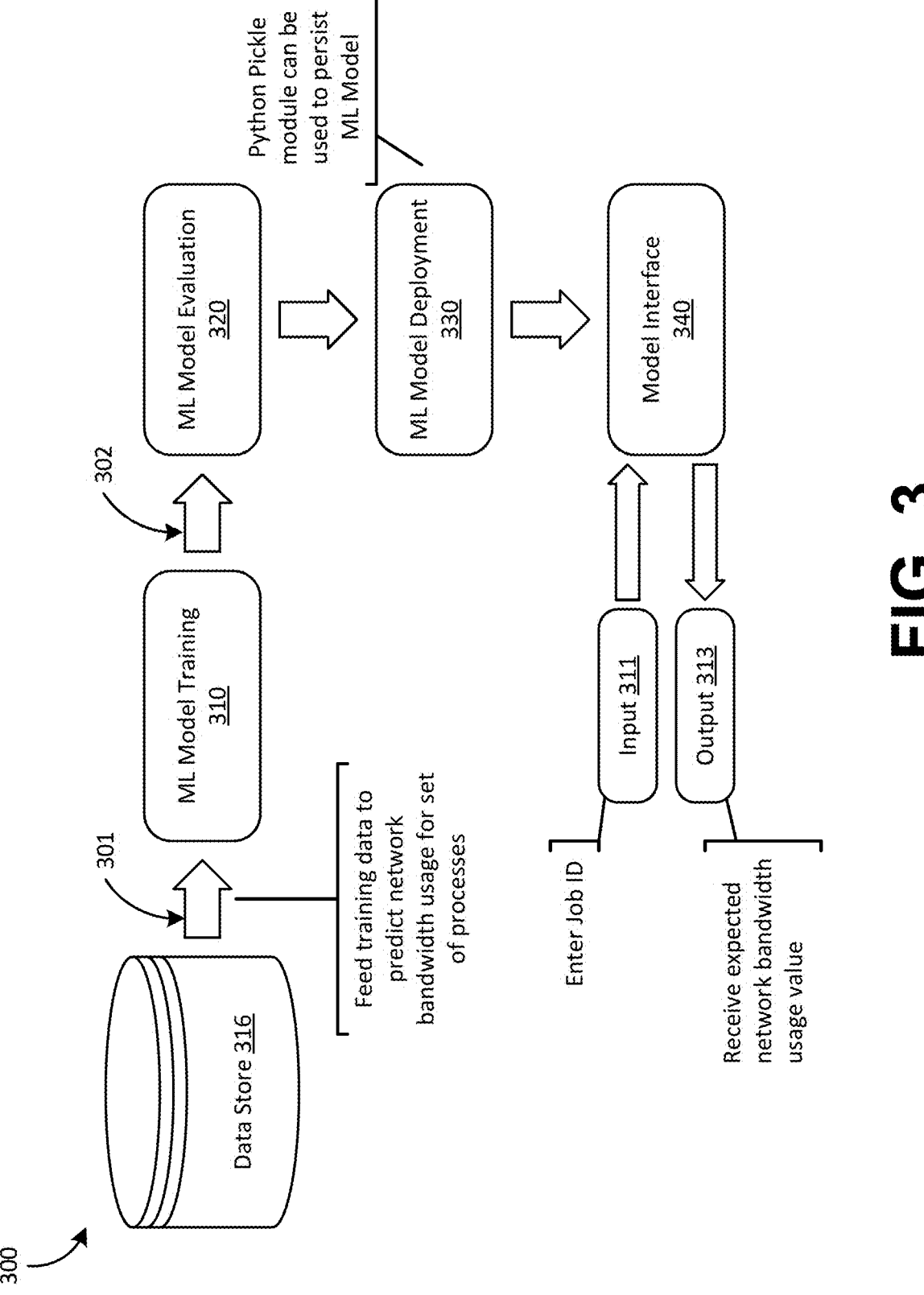
FIG. 3 is an example data flow diagram of a process for determining an expected network bandwidth usage value for a set of processes, according to aspects of the disclosure.

FIG. 3 is an example data flow diagram of a process 300 for determining an expected network bandwidth usage value for a set of processes, according to aspects of the disclosure. Process 300 can be performed by processing logic comprising hardware, software, firmware, or any combination thereof. The processing logic can be implemented in one or more computing devices, such as a first device for training an ML model, such as ML model 131, and a second device for using the trained mode for predictions. In at least one embodiment, process 300 is performed by network bandwidth-aware scheduling module 112 of FIG. 1A-E. In another embodiment, the process 300 can be performed by the processing device 114 of FIG. 1A.

In at least one embodiment, the process 300 includes a pipeline with a training phase, such as ML model training 310, and a deployment phase, such as ML model deployment 330. During the ML model training 310, processing logic can perform operations for data preparation of relevant features for training the ML model 302. In at least one embodiment, the data store 316 can store job information including the network bandwidth usage values collected by network bandwidth monitoring module 140 and telemetry data for servers and/or racks collected by telemetry data module 150. In at least one embodiment, processing logic can aggregate the job information into a set of features 301 for a given period (e.g., each hour of a given date). The processing logic can input the set of features 301 into the ML model training 310.

In at least one embodiment, the ML model training 310 can train one or more ML models, such as ML model 302, to be evaluated at an evaluation phase, such as ML model evaluation 320. In at least one embodiment, the one or more trained ML models (e.g., ML model 302) can include one or more of a logistics regression model, a k-nearest neighbor model, a random forest regression model, an SVM, a gradient boost model, or an XGBoost. Alternatively, other ML models can also be used.

In at least one embodiment, the ML model evaluation 320 can evaluate the one or more ML models 302. In at least one embodiment, the ML model evaluation techniques can include R Square, Adjusted R Square, Mean Square Error (MSE), Root Mean Square Error (RMSE), Mean Absolute Error (MAE), or the like. Once trained at ML model training 310, a trained ML model (e.g., ML model 302) is deployed. The trained ML model can be similar to ML model 131 of FIG. 1A.

In at least one embodiment, the machine learning pipeline can include data preparation, ML model training, ML model evaluation, and ML model deployment. As part of the data preparation, the job information (e.g., information about the set of processes) is aggregated as feature attributes. For the ML model training, the feature attributes are used as inputs.

Once trained in at ML model training 310, a trained ML model (e.g., ML model 302) can be persisted as an object by serialization/deserialization of the ML model 131 (e.g., using Python Pickle library or other serialization/deserialization technologies) at ML model deployment 330. During ML model deployment 330, the object can be deployed to an endpoint device, such as described above as the ML model 131 deployed on the processing device 114 of FIG. 1A. In at least one embodiment, the object can be used to serve the ML model 131 using an interface, such as a REST API at model interface 340. In at least one embodiment, the REST APIs are exposed to users (e.g., administrators of the data center 101), where a user can pass the feature attributes (e.g., job or application name) for a specified period (e.g., a given hour/day) as input 311. The REST API can return an output 313 with an indication of an expected network bandwidth usage value for the specified period (e.g., the given hour/day). In at least one embodiment, the ML model 131 is persisted using Python's pickle library, such as represented in the following example:

```
import pickle
model.fit(X_train, Y_train)
# save the model to disk
  filename = 'model_final.sav'
  pickle.dump(model, open(filename, 'wb'))
# load the model from disk
  loaded_model = pickle.load(open(filename, 'rb'))
  result = loaded_model.score(X_test, Y_test)
```

The ML model 131 is served using example Python modules below to load the persisted module and expose as REST API:

```
# Import Module
  from flask import Flask, jsonify, request
  from flask_cors import CORS
  import joblib
  import json
  import logging
# Load the previously trained model from pkl file
  model = joblib.load("pkl_file_path")
  temp_y_preds = model.predict(temp_X_test)
```

In at least one embodiment, the processing logic can use a summary job to make a call to REST API endpoint devices and store a mode status (power of performance modes) of each core of the computing device for each hour/day or other specified time periods. The summary job can use a UI dashboard 106 to provide visualization of the idle cores of the computing devices. The model interface 340 can include a list of racks and/or servers with underutilized network bandwidth for a previous day, a continuous list for a number of days, a list for a given data range, or the like. The UI dashboard 106 can also provide a mechanism for a user (e.g., administrator) to enter a device name and specified date/time period to find whether the corresponding computing device is idle or busy. In other embodiments, the ML model can be a neural network, such as a deep neural network.

Figure 4:
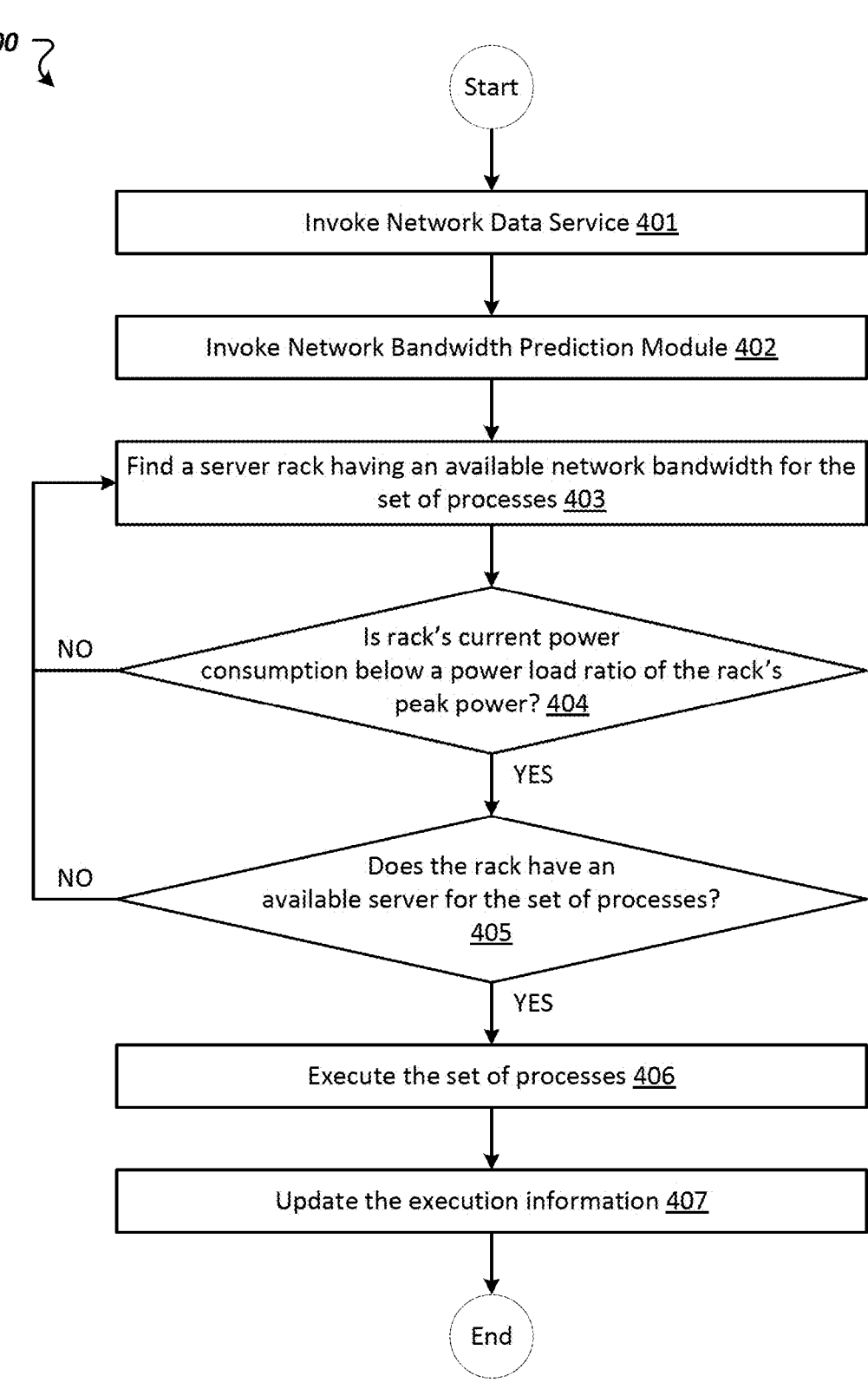
FIG. 4 illustrates a method of network bandwidth-aware scheduling, according to aspects of the disclosure.

FIG. 4 illustrates a method 400 of network bandwidth-aware scheduling, according to aspects of the disclosure. Method 400 can be performed by processing logic comprising hardware, software, firmware, or any combination thereof. The processing logic can be implemented in one or more computing devices. In at least one embodiment, method 400 can be performed by network bandwidth-aware scheduling module 112 of FIGS. 1A-D. In another embodiment, the method 400 can be performed by the processing device 114 of FIG. 1A.

At operation 401, processing logic begins method 400 by invoking the network data service. In at least one embodiment, the network data service can return details of server racks with available network bandwidth, such as an available network bandwidth value for each server rack, power usage values, etc.

At operation 402, processing logic invokes the network bandwidth prediction module. In at least one embodiment, the network bandwidth prediction module can fetch the expected network bandwidth for a set of processes (e.g., from metadata associated with the set of processes). In at least one embodiment, the network bandwidth prediction module can predict the expected network bandwidth for a set of processes. In at least one embodiment, the prediction can be based on historical network bandwidth values associated with the same, or similar sets of processes. In at least one embodiment, the prediction can be made using a machine learning model trained to predict network bandwidth values for sets of processes. Additional details regarding predicting the expected network bandwidth value for a set of processes is described below with reference to FIG. 6.

At operation 403, processing logic finds a server rack having an available network bandwidth for the set of processes. Additional details regarding finding the server rack having the available network bandwidth for the set of processes is described below with reference to FIGS. 4-6.

At operation 404, processing logic determines whether a server rack's power usage is below a power load ratio of the server rack's peak power. If the server rack's power usage is at, or above the power load ratio of the server rack's peak power, processing logic can return to operation 403. If the server rack's power usage is below the power load ratio of the server rack's peak power, processing logic can proceed to operation 405. In an illustrative example, and in at least one embodiment, a power load ratio of a server rack can be 90%, and a server rack can have a peak power of 10 kilowatts. In the illustrative example, if the server rack's power usage is below 9 kilowatts, processing logic can indicate that the server rack's power usage is below the power load ratio of the server rack's peak power.

At operation 405, responsive to determining the server rack's power usage is below the power load ratio of the server rack's peak power, processing logic can determine whether the server rack has an available server for the set of processes. If the server rack does not have an available server, processing logic can return to operation 403. If the server rack does have an available server, processing logic can proceed to operation 406.

At operation 406, responsive to determining a server rack has an available server for the set of processes, processing logic can execute the set of processes. After executing the set of processes, at operation 407, processing logic can update the execution information. The execution information can be stored in a data store, such as data store 116 of FIG. 1A, and can include, for example, a job identifier, a job start time, a job end time, an actual network bandwidth usage value while executing the job, one or more hardware usage metrics corresponding to execution of the job, etc.

Figure 5:
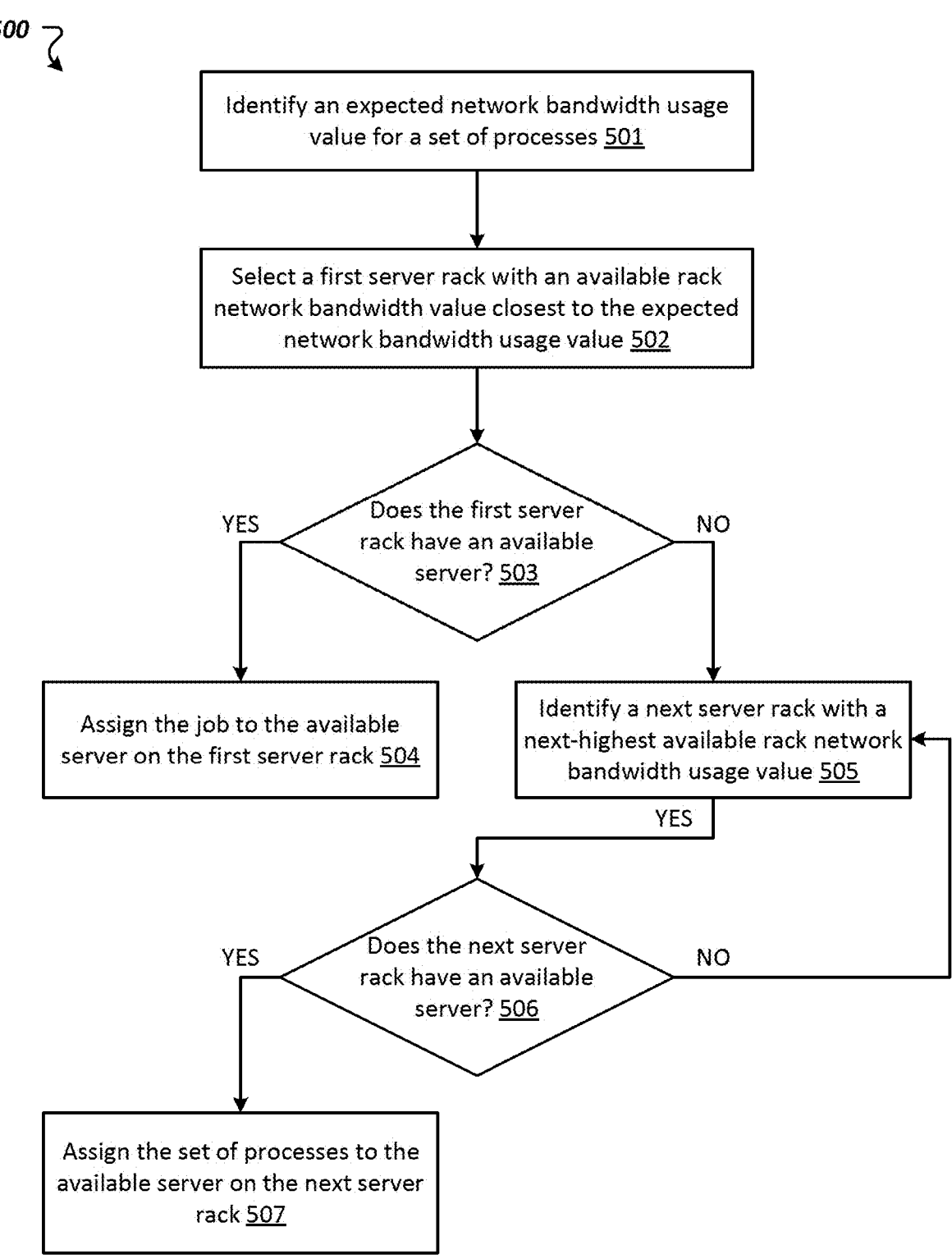
FIG. 5 illustrates a method of network bandwidth-aware scheduling, according to aspects of the disclosure.

FIG. 5 illustrates a method 500 of network bandwidth-aware scheduling, according to aspects of the disclosure. Method 500 can be performed by processing logic comprising hardware, software, firmware, or any combination thereof. The processing logic can be implemented in one or more computing devices. In at least one embodiment, method 500 can be performed by network bandwidth-aware scheduling module 112 of FIGS. 1A-D. In another embodiment, the method 500 can be performed by the processing device 114 of FIG. 1A.

At operation 501, the processing logic begins the method 500 by identifying an expected network bandwidth usage value for a set of processes. The set of processes can include one or more applications, jobs, tasks, routines, or the like. In at least one embodiment, the expected network bandwidth usage value for the set of processes can be determined using metadata included along with the set of processes. For example, and in at least one embodiment, an expected network bandwidth usage value can be included as metadata along with the set of processes when sent to the scheduler (such as the network bandwidth-aware scheduling module 112 described with reference to FIGS. 1A-D). In at least one embodiment, the UI dashboard (e.g., UI dashboard 106 of FIG. 1A) used by a user to send the set of processes to the scheduler 110 can request the user provide an expected network bandwidth usage value for the set of processes. In at least one embodiment, the expected network bandwidth usage value can be predicted by a ML model trained on the historical network bandwidth usage values. Additional details regarding predicting an expected network bandwidth usage value for the set of processes based on historical network bandwidth usage values is described with reference to FIG. 6.

At operation 502, the processing logic selects a first server rack with an available network bandwidth value. The available rack network bandwidth capacity can refer to a difference between a real-time network bandwidth usage value for a given rack and a maximum network bandwidth value for the rack. For example, referring to Table 1 above, Rack(a) has a rack network bandwidth capacity of 10.0 Tbps. The real-time network bandwidth usage of Rack(a) is 2.0 Tbps. Thus, Rack(a) has an available network bandwidth capacity of 8 Tbps. Continuing to refer to Table 1, as illustrated in the "Available Rack Network bandwidth" column, Rack(a) has the closest available network bandwidth value. Thus, in the illustrative set of Rack(a)-Rack(M), at operation 502, processing logic would select Rack(a) as the first server rack with the available network bandwidth value.

At operation 503, the processing logic determines whether the first server rack has an available server. If the first server rack has an available server, processing logic proceeds to operation 504. If the first server rack does not have an available server, processing logic proceeds to operation 505. In at least one embodiment, processing logic can determine whether a server of a server rack is available based on the network bandwidth usage of the server. Additional details regarding determining whether the server is available based on the network bandwidth usage of the server are described with reference to FIGS. 3-4. In at least one embodiment, processing logic can determine whether a server of a server rack is available based on usage metrics of hardware components of the server. Additional details regarding determining whether the server is available based on usage metrics of the hardware components of the server are described with reference to FIG. 5.

At operation 504, responsive to determining the first server rack has an available server, processing logic assigns the set of processes to the available server on the first server rack. In at least one embodiment, processing logic can check whether a first server of the first server rack is available. Responsive to determining the first server of the first server rack is not available, processing logic can check whether a second server of the first server rack is available, and further whether a third server is available etc. Additional details regarding selecting an available server from a rack are described with reference to FIGS. 3-5.

At operation 505, responsive to determining the first server rack does not have an available server, processing logic identifies a next server rack with a next-closest available network bandwidth value. For example, referring to Table 1, as illustrated in the "Available Rack Network bandwidth" column, Rack(M) has the closest available rack network bandwidth capacity, Rack(b) has the second closest (e.g., "next-closest") available rack network bandwidth capacity, and Rack(a) has the third closest (e.g., "next-closest" after Rack(b)) available rack network bandwidth capacity. Thus, in the illustrative set of Rack(a)-Rack(M), at operation 505, processing logic would select Rack(b) as the next server rack with the next-closest available network bandwidth value.

In embodiments, where processing logic has started operation 505 in response to failing the operation 506, processing logic can then select the next server rack with the next-closest available network bandwidth value. For example, referring again to Table 1, as illustrated in the "Available Rack Network bandwidth" column, after processing logic determines that Rack(a) does not have an available server, and has determined that Rack(b) does not have an available server (e.g., the rack with the "next-closest" available network bandwidth capacity), then in the illustrative example, the next-closest available network bandwidth capacity is the available network bandwidth capacity of Rack(M). Thus, in the illustrative set of Rack (a)-Rack(M), where Rack(a) and Rack(b) have a larger available rack network bandwidth capacity than Rack(M), but neither Rack(a) nor Rack(b) have an available server, at operation 505, processing logic would select Rack(M) as the next server rack with the next-closest available network bandwidth value. Additional details regarding selecting a server rack with an available rack network bandwidth capacity (e.g., a "closest," or "next-closest rack network bandwidth capacity" are described with reference to FIGS. 3-5).

At operation 506, processing logic determines whether the next server rack has an available server. In at least one embodiment, processing logic can check whether a first server of the first server rack is available. Responsive to determining the first server of the first server rack is not available, processing logic can check whether a second server of the first server rack is available, etc. Additional details regarding selecting an available server from a rack are described with reference to FIGS. 3-5. If the next server rack does not have an available server, processing logic returns to operation 505. If the next server rack does have an available server, processing logic proceeds to operation 507.

At operation 507, responsive to determining the next server rack has an available server, processing logic assigns the set of processes to the available server on the next server rack.

FIG. 6 illustrates a method 600 of network bandwidth-aware scheduling, according to aspects of the disclosure. Method 600 can be performed by processing logic comprising hardware, software, firmware, or any combination thereof. The processing logic can be implemented in one or more computing devices. In at least one embodiment, method 600 can be performed by network bandwidth-aware scheduling module 112 of FIGS. 1A-D. In another embodiment, the method 600 can be performed by the processing device 114 of FIG. 1A.

At operation 601, the processing logic begins the method 600 by receiving a set or processes. The set of processes can include one or more applications, jobs, tasks, routines, or the like. In at least one embodiment, the set of processes can be received at a scheduler, such as scheduler 110 or network bandwidth-aware scheduling module 112 as described with reference to FIGS. 1A-D. In at least one embodiment, metadata associated with the set of processes can be received along with the set of processes. For example, and in at least one embodiment, a network bandwidth usage value can be received as metadata along with the set of processes. In another example, and in at least one embodiment, a job ID can be received as metadata along with the set of processes. The job ID can be unique to the set of processes. In at least one embodiment, the job ID can indicate a job family ID. In at least one embodiment, a job family ID can be received as metadata with the set of processes. For example, and in at least one embodiment, a job ID can uniquely identify a particular set of processes from other sets of processes (concurrent or historical) and a job family ID can identify a type or "family" of sets of processes (e.g., a repeated set of processes run at different times, or in different conditions).

At operation 602, determines whether the set of processes have previously been performed. If the set of processes have not previously been performed, processing logic proceeds to operation 603. If the set of processes have previously been performed, processing logic proceeds to operation 604. In at least one embodiment, processing logic can use a job ID to determine whether a given set of processes have previously been performed. In at least one embodiment, processing logic can use a job ID and/or a job family ID to determine whether sets of processes similar to the received set of processes have previously been performed. In at least one embodiment, processing logic can use additional metadata associated with the received set of processes to determine whether the set of processes have previously been performed.

At operation 603, responsive to determining that the set of processes have not previously been performed, processing logic obtains an expected network bandwidth usage value for the set of processes from metadata associated with the set of processes. For example, and in at least one embodiment, associated metadata can include a network bandwidth usage value associated with the set of processes, a compute resource requirement for the set of processes, etc. After performing operation 603, processing logic proceeds to operation 606.

At operation 604, responsive to determining that the set of processes have previously been performed, processing logic obtains one or more historical network bandwidth usage values corresponding to the set of processes from a data store. In at least one embodiment, the one or more historical network bandwidth usage values for performing the set of processes (or a similar set of processes) can be stored in a data store associated with the scheduler (such as data store 116). In at least one embodiment, while a set of processes is being performed, a network bandwidth monitoring module, (e.g., network bandwidth monitoring module 140 described with reference to FIGS. 1A-D) can record, in real-time at specified intervals (e.g., every 5 seconds, every 5 minutes, every 5 hours, etc.), the network bandwidth usage value corresponding to the set of processes. In at least one embodiment, the network bandwidth monitoring module 140 can record a maximum network bandwidth usage value associated with performing the set of processes. In an illustrative example, a set of processes can be performed over a 30-minute interval. During the 30-minute interval, a maximum network bandwidth usage value associated with performing the set of processes can refer to a peak network bandwidth usage value during the 30-minute interval that was required to perform the set of processes.

In embodiments, the historical network bandwidth usage value for a set of processes can be estimated based on a network bandwidth usage value of a server performing the set of processes (along with other sets of processes) over the duration of time required to perform the set of processes. In an illustrative example, a first set of processes can be performed by a server over a 30-minute duration. Concurrently, one or more additional sets of processes can be performed by the server during the 30-minute duration. The quantity of the one or more additional sets of processes during the 30-minute duration can fluctuate based on each respective set of processes (e.g., a set of processes can start, stop, and/or start and stop over the 30-minute duration). By using timestamps associated with each set of processes (e.g., a start and end time), and real-time network bandwidth usage values for the server collected at regular intervals during the 30-minute duration, the network bandwidth monitoring module 140 can estimate a network bandwidth usage value associated without actually performing the set of processes, and store that estimated network bandwidth usage value in data store 116 as a historical network bandwidth usage value associated with a given set of processes.

At operation 605, processing logic predicts, based on the one or more historical network bandwidth usage values, an expected network bandwidth usage value associated with the set of processes. In at least one embodiment, processing logic can determine an average, mean, median, or mode of historical network bandwidth usage values for a set of processes to predict the estimated network bandwidth usage value. In at least one embodiment, an ML model can be trained on the historical network bandwidth usage values for the set of processes. In at least one embodiment, the ML model can be trained on metadata associated with performing previous sets of processes. The ML model can identify various hidden patterns in the historical network bandwidth usage values associated with a set of processes or group of sets of processes (e.g., a sets of processes with the same job ID or job family ID). In at least one embodiment, the ML model can be trained using historical network bandwidth usage values and ground truth data. As described above, in at least one embodiment, the ML model can be one or more of a logistics regression model, a k-nearest neighbor model, a random forest regression model, a gradient boost model, or an XGBoost model. Alternatively, in at least one embodiment, other types of ML models can be used. The trained ML model can be deployed as an object to a computing device operatively coupled to the network bandwidth monitoring module 140 and/or a network bandwidth-aware scheduling module 112. Additional details regarding predicting the expected network bandwidth usage value using an ML model are described below with reference to FIGS. 8A-B.

At operation 606, processing logic selects a server from a server rack with an available rack network bandwidth value closest to the expected network bandwidth usage value. In at least one embodiment, processing logic can select a server based on usage metrics of hardware components of the server.

At operation 607, processing logic determines whether the server has an available power capacity to perform the set of processes based on an expected power usage value corresponding to the set of processes. If the server does not have the available power capacity to perform the set of processes, processing logic returns to operation 606. If the server does have the available power capacity to perform the set of processes, processing logic proceeds to operation 608. In at least one embodiment, the available power capacity can be calculated by subtracting a real-time server power usage value from a maximum power value of a server. In at least one embodiment, the maximum power value can represent a usable power capacity of the server, with a built-in overhead protection. In at least one embodiment, a server power capacity (e.g., the maximum power value) represents the power supplied by a power deliver unit (PDU) to the server. In at least one embodiment, processing logic can determine whether a sum of the real-time power usage value and the power consumption value exceed a threshold value representing the maximum power value of the first server rack. Responsive to determining the sum does not exceed the threshold value representing the maximum power value for the server rack, processing logic can indicate the set of processes can be assigned to servers of the server rack.

At operation 608, responsive to determining the server has the available network bandwidth capacity, processing logic assigns the set of processes to the server.

At operation 609, responsive to performing the set of processes at the server, processing logic stores an actual network bandwidth usage value corresponding to the set of processes to the data store. In at least one embodiment, the actual network bandwidth usage value can be used for predicting expected network bandwidth usage values for future sets of processes.

FIG. 7 illustrates a method 700 of network bandwidth-aware scheduling, according to aspects of the disclosure. Method 700 can be performed by processing logic comprising hardware, software, firmware, or any combination thereof. The processing logic can be implemented in one or more computing devices. In at least one embodiment, method 700 can be performed by network bandwidth-aware scheduling module 112 of FIGS. 1A-D. In another embodiment, the method 700 can be performed by the processing device 114 of FIG. 1A.

At operation 701, the processing logic begins the method 700 by identifying an expected network bandwidth value for a set of processes.

At operation 702, the processing logic obtains a real-time network bandwidth usage value for a server rack. In at least one embodiment, the real-time network bandwidth usage value for a server rack can be obtained with a network bandwidth monitoring module 140. As described above, the network bandwidth monitoring module 140 can include hardware, software, and/or firmware and can couple to servers with by network connection (e.g., network connection 128 of FIG. 1A). In at least one embodiment, the network bandwidth monitoring module 140 can be coupled to the server in parallel with other network connections. For example, the network bandwidth monitoring module 140 can monitor network communications across a network link between the server and one or more systems of data center environment 100A. In at least one embodiment, the network bandwidth monitoring module 140 can send a request to one or more modules coupled to one or more servers of a server rack (e.g., by a network connection 128). In response, the network bandwidth monitoring module 140 can receive metadata which can include, for example, a real-time network bandwidth usage value for the server or server rack. In at least one embodiment, the network bandwidth usage value for a server rack can be represented as a sum of the network bandwidth usage values for each server on the serving rack.

At operation 703, processing logic determines whether the server rack has an available network bandwidth for the set of processes based on (i) the expected network bandwidth value, and (ii) the real-time network bandwidth usage value. If processing logic determines the server rack does not have an available network bandwidth for the set of processes, processing logic can return to operation 702 and select another server rack. If processing logic determines the server rack does have an available network bandwidth for the set of processes, processing logic can proceed to operation 704.

At operation 704, processing logic assigns the set of processes to a server of the server rack. In at least one embodiment, a server of the server rack can be selected based on the network bandwidth usage of the server. In at least one embodiment, processing logic can select a server based on usage metrics of hardware components of the server. As described above, for example, and in at least one embodiment, each server can include various hardware components, such as a CPU, a GPU, a DPU, a volatile memory and/or a nonvolatile memory. A "hardware usage metric" can refer to the ability of the various hardware components to accept a new process, and in at least one embodiment can be represented as a percentage. By way of a non-limiting example, a 75% usage metric for a CPU can represent that the CPU has an available 25% to take on additional processes. Each set of processes can have a required, or estimated compute resource load. That is, a set of processes can be associated with estimated usage metrics of the various hardware components. By way of a non-limiting example, a set of processes can require 5% of a server's CPU, 15% of the server's GPU, 5% of the server's DPU, 30% of the server's volatile memory, and 1% of the server's nonvolatile memory. Continuing with an illustrative example, if the usage metric corresponding to the server's volatile memory is at 80%, then based on the usage metrics of the hardware components of the server (e.g., the nonvolatile memory), the server is unable to perform the set of processes, because 80%+30% exceeds the available 100%, and thus the server would be unavailable (e.g., the server does not have available compute resources based on usage metrics of the hardware components of the server). Alternatively, continuing with another illustrative example, if the usage metric corresponding to the server's volatile memory is at 40%, and the remaining usage metrics corresponding to hardware components of the server are at 10%, then based on the usage metrics of the hardware components of the server, the server will be able to perform the set of processes, and thus the server would be available (e.g., the server has available compute resources based on usage metrics of the hardware components of the server).

In at least one embodiment, processing logic can determine a duration associated with performing the set of processes. For example, and in at least one embodiment, the duration for performing the set of processes can be based on the compute resources required to perform the process. In an illustrative example, if a server has a CPU with a certain clock speed, and the set of processes include a certain quantity of operations to be performed by the CPU, the duration for performing the set of processes can be expressed as: $D=Q*R$, where D is a duration expressed as a length of time, Q is the quantity of operations in the set of processes, and R is the quantity of operations that can be performed relative to each clock cycle, based on the CPU clock speed. For example, and in at least one embodiment, the CPU of a server can perform one or more operations per clock cycle, depending on the complexity of the operation, the number of cores in the CPU, and/or the number of threads in the CPU. The duration D can likewise be calculated for each hardware component of the server, such as GPUs, DPUs, and/or volatile or non-volatile memory devices. The duration $D_M$ that has the largest value of the durations D corresponding to each hardware component of the server can be identified as the duration for performing the set of processes. In at least one embodiment, additional considerations can adjust the duration $D_M$, such as bus bandwidth between hardware components, cache speed, and/or other signal latency limitations.

In at least one embodiment, processing logic can predict based on the duration for performing the set of processes and usage metrics of the hardware components of the server, an expected network bandwidth usage value. The duration for performing the set of processes can indicate how long the set of processes will take to perform, and the usage metrics of the hardware components of the server can indicate what percentage of the hardware component will be used to perform the set of processes. In at least one embodiment, the duration can be used by the network bandwidth-aware scheduling module, such as network bandwidth-aware scheduling module 112 of FIGS. 1A-1D to determine or estimate when a rack and/or server network bandwidth usage values will change (relative to the estimated network bandwidth usage value) based on the completion of the set of processes. Alternatively, in at least one embodiment, additional data can be used to determine the expected network bandwidth usage for the set of processes based on hardware usage metrics of hardware components of the server. In at least one embodiment, the set of processes can be accompanied with metadata indicating an expected network bandwidth usage value to perform the set of processes.

Inference and Training Logic

FIG. 8A illustrates a hardware structure 808 for performing inference and/or training logic 800A and 800B, according to aspects of the disclosure. Details regarding the hardware structure 808 are provided below as part of FIG. 8A and/or FIG. 8B as 800A and 800B, respectively.

In at least one embodiment, hardware structure 808 for inference and/or training logic 800A/B can include, without limitation, code storage and/or data storage 802 to store forward and/or output weight and/or input/output data, and/or other parameters to configure neurons or layers of a neural network trained and/or used for inferencing in aspects of one or more embodiments. In at least one embodiment, hardware structure 808 can include, or be coupled to data storage 802 to store graph code or other software to control the timing and/or order, in which weights and/or other parameter information can be loaded to configure, logic, including integer and/or floating point units (collectively, arithmetic logic units (ALUs), such as ALU 806). In at least one embodiment, code, such as graph code, can be configured to load weights or other parameter information into ALUs 806 based on an architecture of a neural network to which the code corresponds. In at least one embodiment, data storage 802 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of data storage 802 can be included with other on-chip or off-chip components for data storage 802, including a processor's L1, L2, or L3 cache or system memory.

In at least one embodiment, any portion of data storage 802 can be internal or external to one or more processors or other hardware logic devices or circuits. In at least one embodiment, data storage 802 can be cache memory, dynamic randomly addressable memory ("DRAM"), static randomly addressable memory ("SRAM"), non-volatile memory (e.g., Flash memory), or other storage. In at least one embodiment, the choice of whether the data storage 802 is internal or external to a processor, for example, or comprised of DRAM, SRAM, Flash, or some other storage type can depend on available storage on-chip versus off-chip, latency requirements of training and/or inferencing functions being performed, batch size of data used in inferencing and/or training of a neural network, or some combination of these factors.

In at least one embodiment, hardware structure 808 for inference and/or training logic 800A/B can include, without limitation, a data storage 804 to store backward and/or output weight and/or input/output data corresponding to neurons or layers of a neural network trained and/or used for inferencing in aspects of one or more embodiments. In at least one embodiment, data storage 804 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, hardware structure 808 can include, or be coupled to data storage 804 to store graph code or other software to control the timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, any portion of data storage 804 can be included with other on-chip or off-chip data storage, including a processor's L1, L2, or L3 cache or system memory. In at least one embodiment, any portion of data storage 804 can be internal or external to one or more processors or other hardware logic devices or circuits. In at least one embodiment, data storage 804 can be cache memory, DRAM, SRAM, non-volatile memory (e.g., Flash memory), or other storage. In at least one embodiment, the choice of whether the data storage 804 is internal or external to a processor, for example, or comprised of DRAM, SRAM, Flash or some other storage type can depend on available storage on-chip versus off-chip, latency requirements of training and/or inferencing functions being performed, batch size of data used in inferencing and/or training of a neural network, or some combination of these factors.

In at least one embodiment, data storage 802 and data storage 804 can be separate storage structures. In at least one embodiment, data storage 802 and data storage 804 can be the same storage structure. In at least one embodiment, data storage 802 and data storage 804 can be partially the same storage structure and partially separate storage structures. In at least one embodiment, any portion of data storage 802 and data storage 804 can be included with other on-chip or off-chip data storage, including a processor's L1, L2, or L3 cache or system memory.

In at least one embodiment, hardware structure 808 for inference and/or training logic 800A/B can include one or more ALUs, such as ALU 806, including integer and/or floating point units, to perform logical and/or mathematical operations based, at least in part on, or indicated by, training and/or inference code (e.g., graph code), a result of which can produce activations (e.g., output values from layers or neurons within a neural network) stored in a network bandwidth ML model storage 810 that are functions of input/output and/or weight parameter data stored in data storage 802 and/or data storage 804. In at least one embodiment, activations stored in the network bandwidth ML model storage 810 are generated according to linear algebraic and or matrix-based mathematics performed by ALU 806 in response to performing instructions or other code, wherein weight values stored in data storage 804 and/or data storage 802 are used as operands along with other values, such as bias values, gradient information, momentum values, or other parameters or hyperparameters, any or all of which can be stored in data storage 804 or data storage 802 or another storage on or off-chip.

In at least one embodiment, ALU 806 are included within one or more processors or other hardware logic devices or circuits, whereas in another embodiment, ALU 806 can be external to a processor or other hardware logic device or circuit that uses them (e.g., a co-processor). In at least one embodiment, ALUs 806 can be included within a processor's execution units or otherwise within a bank of ALUs accessible by a processor's execution units either within the same processor or distributed between different processors of different types (e.g., central processing units, graphics processing units, fixed function units, etc.). In at least one embodiment, data storage 802, data storage 804, and the network bandwidth ML model storage 810 can be on the same processor or other hardware logic device or circuit, whereas in another embodiment, they can be in different processors or other hardware logic devices or circuits, or some combination of same and different processors or other hardware logic devices or circuits. In at least one embodiment, any portion of the network bandwidth ML model storage 810 can be included with other on-chip or off-chip data storage, including a processor's L1, L2, or L3 cache or system memory. Furthermore, inferencing and/or training code can be stored with other code accessible to a processor or other hardware logic or circuit and fetched and/or processed using a processor's fetch, decode, scheduling, execution, retirement, and/or other logical circuits.

In at least one embodiment, the network bandwidth ML model storage 810 can be cache memory, DRAM, SRAM, non-volatile memory (e.g., Flash memory), or other storage. In at least one embodiment, the network bandwidth ML model storage 810 can be completely or partially within or external to one or more processors or other logical circuits. In at least one embodiment, the choice of whether the network bandwidth ML model storage 810 is internal or external to a processor, for example, or comprised of DRAM, SRAM, Flash or some other storage type can depend on available storage on-chip versus off-chip, latency requirements of training and/or inferencing functions being performed, batch size of data used in inferencing and/or training of a neural network, or some combination of these factors. In at least one embodiment, hardware structure 808 illustrated in FIG. 8A can be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, hardware structure 808 illustrated in FIG. 8A can be used in conjunction with central processing unit ("CPU") hardware, graphics processing unit ("GPU") hardware, or other hardware, such as field programmable gate arrays ("FPGAs").

FIG. 8B illustrates hardware structure 808, according to at least one or more embodiments. In at least one embodiment, hardware structure 808 can include, without limitation, hardware logic in which computational resources are dedicated or otherwise exclusively used in conjunction with weight values or other information corresponding to one or more layers of neurons within a neural network. In at least one embodiment, hardware structure 808 illustrated in FIG. 8B can be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, hardware structure 808 illustrated in FIG. 8B can be used in conjunction with central processing unit (CPU) hardware, graphics processing unit (GPU) hardware, or other hardware, such as field programmable gate arrays (FPGAs). In at least one embodiment, hardware structure 808 includes, without limitation, data storage 802 and data storage 804, which can be used to store code (e.g., graph code), weight values and/or other information, including bias values, gradient information, momentum values, and/or other parameter or hyperparameter information. In at least one embodiment illustrated in FIG. 8B, each of data storage 802 and data storage 804 is associated with a dedicated computational resource, such as computational hardware 812 and computational hardware 814, respectively. In at least one embodiment, each of computational hardware 812 and computational hardware 814 comprises one or more ALUs that perform mathematical functions, such as linear algebraic functions, only on information stored in data storage 802 and data storage 804, respectively, the result of which is stored in the network bandwidth ML model storage 810.

In at least one embodiment, each of data storage 802 and 804 and corresponding computational hardware (e.g., computational hardware 812 and 814, respectively) correspond to different layers of a neural network, such that the resulting activation from one "storage/computational pair 802/812" of data storage 802 and computational hardware 812 is provided as an input to "storage/computational pair 804/814" of data storage 804 and computational hardware 814, in order to mirror the conceptual organization of a neural network. In at least one embodiment, each of the storage/computational pairs 802/812 and 804/814 can correspond to more than one neural network layer. In at least one embodiment, additional storage/computation pairs (not shown) subsequent to or in parallel with storage computation pairs 802/812 and 804/814 can be included in hardware structure 808.

Data Center

Figure 9:
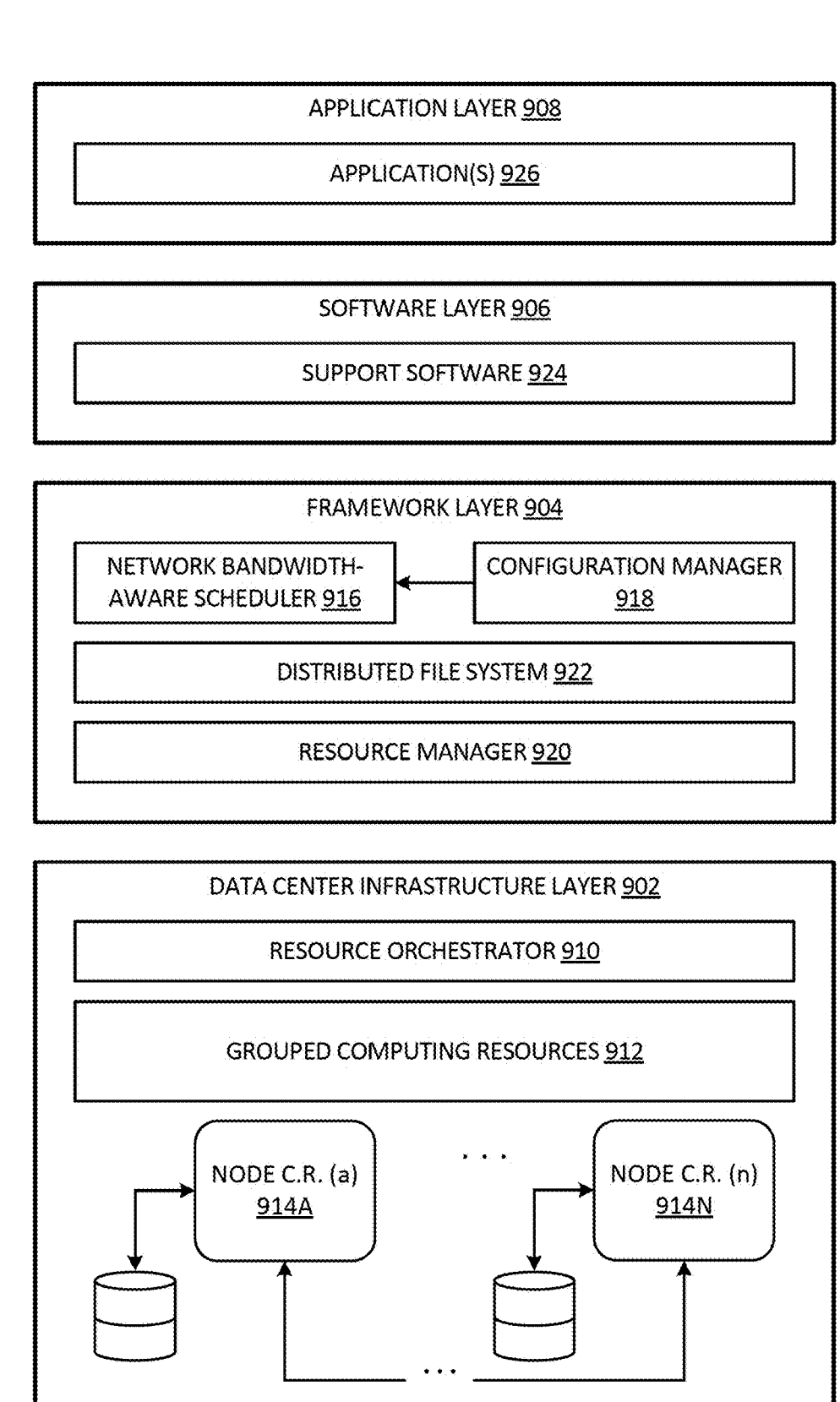
FIG. 9 illustrates an example of a data center, according to aspects of the disclosure.

FIG. 9 illustrates an example of a data center 900, according to aspects of the disclosure. In at least one embodiment, data center 900 includes a data center infrastructure layer 902, a framework layer 904, a software layer 906, and an application layer 908.

In at least one embodiment, as shown in FIG. 9, data center infrastructure layer 902 can include a resource orchestrator 910, grouped computing resources 912, and node computing resources (node C.R.s) 914A(a)-914N(n), where "N" represents any whole, positive integer. In at least one embodiment, node C.R.s 914A(a)-914N(n) can include, but are not limited to, any number of central processing units (CPUs) or other processors (including accelerators, field-programmable gate arrays (FPGAs), graphics processors, etc.), memory devices (e.g., dynamic read-only memory), storage devices (e.g., solid-state or disk drives), network input/output (NW I/O) devices, network switches, virtual machines (VMs), network bandwidth modules, and cooling modules, etc. In at least one embodiment, one or more node C.R.s from among node C.R.s 914A(a)-914N(n) can be a server having one or more of the above-mentioned computing resources.

In at least one embodiment, grouped computing resources 912 can include separate groupings of node C.R.s housed within one or more racks (not illustrated), or many racks housed in data centers at various geographical locations (also not illustrated). Separate groupings of node C.R.s within grouped computing resources 912 can include grouped compute, network, memory, or storage resources that can be configured or allocated to support one or more workloads. In at least one embodiment, several node C.R.s, including CPUs or processors, can be grouped within one or more racks to provide compute resources to support one or more workloads. In at least one embodiment, one or more racks can also include any number of network bandwidth modules, cooling modules, and network switches, in any combination.

In at least one embodiment, resource orchestrator 910 can configure or otherwise control one or more node C.R.s 914A(a)-914N(n) and/or grouped computing resources 912. In at least one embodiment, the resource orchestrator 910 can include a software design infrastructure (SDI) management entity for data center 900. In at least one embodiment, the resource orchestrator 910 can include hardware, software, or some combination thereof.

In at least one embodiment, as shown in FIG. 9, framework layer 904 includes a network bandwidth-aware scheduler 916, a configuration manager 918, a resource manager 920, and a distributed file system 922. In at least one embodiment, the network bandwidth-aware scheduler 916 can be a scheduler 110 including a network bandwidth-aware scheduling module 112 as described with reference to FIG. 1A. In at least one embodiment, framework layer 904 can include a framework to support software 924 of software layer 906 and/or one or more application(s) 926 of application layer 908. In at least one embodiment, support software 924 or application(s) 926 can respectively include web-based service software or applications, such as those provided by Amazon Web Services, Google Cloud, and Microsoft Azure. In at least one embodiment, framework layer 904 can be, but is not limited to, a type of free and open-source software web application framework such as Apache Spark™ (hereinafter "Spark") that can use the distributed file system 922 for large-scale data processing (e.g., "big data"). In at least one embodiment, network bandwidth-aware scheduler 916 can include a Spark driver to facilitate scheduling workloads supported by various layers of data center 900. In at least one embodiment, configuration manager 918 can be capable of configuring different layers, such as software layer 906 and framework layer 904, including Spark and distributed file system 922, for supporting large-scale data processing. In at least one embodiment, resource manager 920 can be capable of managing clustered or grouped computing resources mapped to or allocated for support of distributed file system 922 and network bandwidth-aware scheduler 916. In at least one embodiment, clustered or grouped computing resources can include grouped computing resources 912 at data center infrastructure layer 902. In at least one embodiment, resource manager 920 can coordinate with resource orchestrator 910 to manage these mapped or allocated computing resources.

In at least one embodiment, support software 924 included in software layer 906 can include software used by at least portions of node C.R.s 914A(a)-914N(n), grouped computing resources 912, and/or distributed file system 922 of framework layer 904. The one or more types of software can include, but are not limited to, Internet web page search software, email virus scan software, database software, and streaming video content software.

In at least one embodiment, application(s) 926 included in application layer 908 can include one or more types of applications used by at least portions of node C.R.s 914A (a)-914N(n), grouped computing resources 912, and/or distributed file system 922 of framework layer 904. One or more types of applications can include, but are not limited to, any number of genomics applications, cognitive computing, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 918, resource manager 920, and resource orchestrator 910 can implement any number and type of self-modifying actions based on any amount and type of data acquired in any technically feasible fashion. In at least one embodiment, self-modifying actions can relieve a data center operator of data center 900 from making possibly bad configuration decisions and possibly avoiding underutilized and/or poor-performing portions of a data center.

In at least one embodiment, data center 900 can include tools, services, software, or other resources to train one or more machine learning models or predict or infer information using one or more machine learning models according to one or more embodiments described herein. For example, in at least one embodiment, a machine learning model can be trained by calculating weight parameters according to a neural network architecture using software and computing resources described above with respect to data center 900. In at least one embodiment, trained machine learning models corresponding to one or more neural networks can be used to infer or predict information using resources described above with respect to data center 900 by using weight parameters calculated through one or more training techniques described herein.

In at least one embodiment, data center 900 can use CPUs, application-specific integrated circuits (ASICs), GPUs, FPGAs, or other hardware to perform training and/or inferencing using the above-described resources. Moreover, one or more software and/or hardware resources described above can be configured as a service to allow users to train or perform inferencing of information, such as image recognition, speech recognition, or other artificial intelligence services.

Computer Systems

Figure 10:
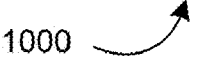
FIG. 10 is a block diagram illustrating an exemplary computer system which can be a system with interconnected devices and components, a system-on-a-chip (SOC), or some combination thereof, according to aspects of the disclosure.

FIG. 10 is a block diagram illustrating an exemplary computer system, such as computer system 1000, which can be a system with interconnected devices and components, a system-on-a-chip (SOC), or some combination thereof, according to aspects of the disclosure. In at least one embodiment, computer system 1000 can include, without limitation, a component, such as a processor 1002, to employ execution units including logic to perform algorithms for process data, in accordance with the present disclosure, such as in the embodiments described herein. In at least one embodiment, computer system 1000 can include processors, such as PENTIUM® Processor family, Xcon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) can also be used. In at least one embodiment, computer system 1000 can execute a version of WINDOWS' operating system available from Microsoft Corporation of Redmond, Wash., although other operating systems (UNIX and Linux, for example), embedded software, and/or graphical user interfaces, can also be used.

Embodiments can be used in other devices such as handheld devices and embedded applications. Some examples of handheld devices include cellular phones, Internet Protocol devices, digital cameras, personal digital assistants (PDAs), and handheld PCs. In at least one embodiment, embedded applications can include a microcontroller, a digital signal processor (DSP), a system on a chip, network computers (NetPCs), set-top boxes, network hubs, wide area network (WAN) switches, or any other system that can perform one or more instructions in accordance with at least one embodiment.

In at least one embodiment, computer system 1000 can include, without limitation, processor 1002 that can include, without limitation, one or more execution units 1008 to perform operations according to techniques described herein. In at least one embodiment, computer system 1000 is a single-processor desktop or server system, but in another embodiment, the computer system 1000 can be a multiprocessor system. In at least one embodiment, processor 1002 can include, without limitation, a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. In at least one embodiment, processor 1002 can be coupled to a processor bus 1010 that can transmit data signals between processor 1002 and other components in computer system 1000.

In at least one embodiment, processor 1002 can include, without limitation, a Level 1 (L1) internal cache memory (cache) cache 1004. In at least one embodiment, processor

1002 can have a single internal cache or multiple levels of internal cache. In at least one embodiment, the cache memory can reside external to processor 1002. Other embodiments can also include a combination of both internal and external caches depending on particular implementation and needs. In at least one embodiment, register file 1006 can store different types of data in various registers, including and without limitation, integer registers, floating-point registers, status registers, and instruction pointer registers.

In at least one embodiment, an execution unit 1008, including and without limitation, logic to perform integer and floating-point operations, also reside in processor 1002. In at least one embodiment, processor 1002 can also include a microcode (μcode) read-only memory (ROM) that stores microcode for certain macro instructions. In at least one embodiment, execution unit 1008 can include logic to handle a network bandwidth-aware scheduling instruction set 1009. In at least one embodiment, by including network bandwidth-aware scheduling instruction set 1009 in an instruction set of a general-purpose processor, such as processor 1002, along with associated circuitry to execute instructions, operations used by many multimedia applications can be performed using packed data in a general-purpose processor, such as processor 1002. In one or more embodiments, many multimedia applications can be accelerated and executed more efficiently by using the full width of a processor's data bus for performing operations on packed data, which can eliminate the need to transfer smaller units of data across the processor's data bus to perform one or more operations one data element at a time.

In at least one embodiment, execution unit 1008 can also be used in microcontrollers, embedded processors, graphics devices, DSPs, and other types of logic circuits. In at least one embodiment, computer system 1000 can include, without limitation, a memory 1016. In at least one embodiment, memory 1016 can be implemented as a Dynamic Random Access Memory (DRAM) device, a Static Random Access Memory (SRAM) device, a flash memory device, or other memory devices. In at least one embodiment, memory 1016 can store instruction(s) 1018 and/or data 1020 represented by data signals that can be executed by processor 1002.

In at least one embodiment, the system logic chip can be coupled to processor bus 1010 and memory 1016. In at least one embodiment, the system logic chip can include, without limitation, a memory controller hub (MCH), such as MCH 1014, and processor 1002 can communicate with MCH 1014 via processor bus 1010. In at least one embodiment, MCH 1014 can provide a high bandwidth memory path 1015 to memory 1016 for instruction and data storage and for storage of graphics commands, data, and textures. In at least one embodiment, MCH 1014 can direct data signals between processor 1002, memory 1016, and other components in computer system 1000 and bridge data signals between processor bus 1010, memory 1016, and a system I/O 1011. In at least one embodiment, a system logic chip can provide a graphics port for coupling to a graphics controller. In at least one embodiment, MCH 1014 can be coupled to memory 1016 through a high bandwidth memory path 1015, and graphics/video card 1012 can be coupled to MCH 1014 through an Accelerated Graphics Port (AGP) interconnect 1013.

In at least one embodiment, computer system 1000 can use the system I/O 1011 that is a proprietary hub interface bus to couple the MCH 1014 to I/O controller hub (ICH), such as ICH 1030. In at least one embodiment, ICH 1030 can provide direct connections to some I/O devices via a local I/O bus. In at least one embodiment, a local I/O bus can include, without limitation, a high-speed I/O bus for connecting peripherals to memory 1016, chipset, and processor 1002. Examples can include, without limitation, data storage 1022, a transceiver 1024, a firmware hub (flash BIOS) 1026, a network controller 1028, a legacy I/O controller 1032 containing a user input interface 1034, a serial expansion port 1036, such as Universal Serial Bus (USB), and an audio controller 1038. In at least one embodiment, data storage 1022 can include a hard disk drive, a floppy disk drive, a CD-ROM device, a flash memory device, or other mass storage devices.

In at least one embodiment, FIG. 10 illustrates a computer system 1000, which includes interconnected hardware devices or "chips," whereas, in other embodiments, FIG. 10 can illustrate an exemplary System on a Chip (SoC). In at least one embodiment, devices can be interconnected with proprietary interconnects, standardized interconnects (e.g., PCIc), or some combination thereof. In at least one embodiment, one or more components of computer system 1000 are interconnected using compute express link (CXL) interconnects.

Figure 11:
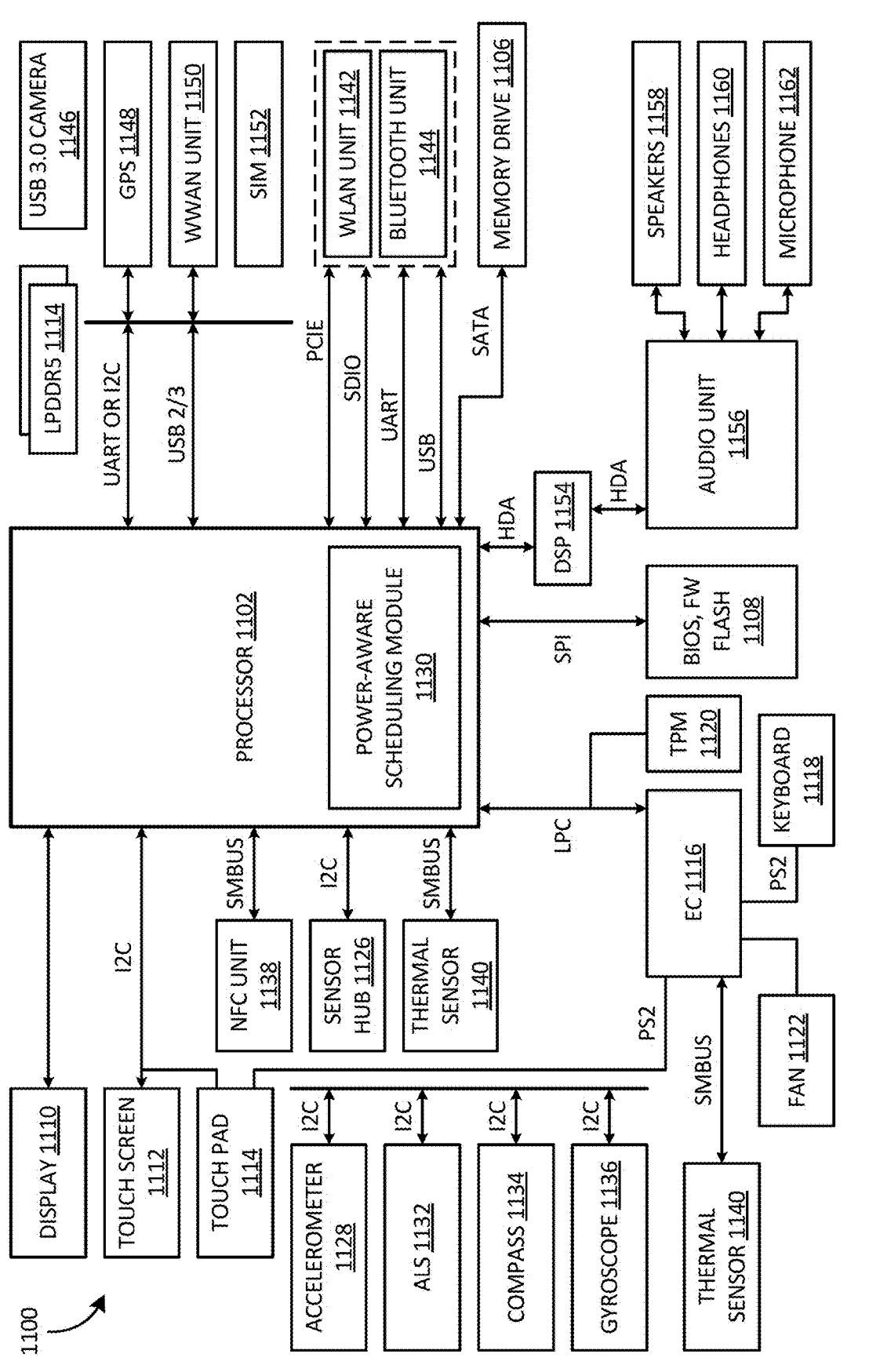
FIG. 11 is a block diagram illustrating an electronic device for utilizing a processor, according to aspects of the disclosure.

FIG. 11 is a block diagram illustrating an electronic device 1100 for using a processor 1102, according to aspects of the disclosure. In at least one embodiment, electronic device 1100 can be, for example, and without limitation, a notebook, a tower server, a rack server, a blade server, a laptop, a desktop, a tablet, a mobile device, a phone, an embedded computer, or any other suitable electronic device.

In at least one embodiment, electronic device 1100 can include, without limitation, processor 1102 communicatively coupled to any suitable number or kind of components, peripherals, modules, or devices. In at least one embodiment, processor 1102 coupled using a bus or interface, such as an 12C bus, a System Management Bus (SMBus), a Low Pin Count (LPC) bus, a Serial Peripheral Interface (SPI), a High Definition Audio (HDA) bus, a Serial Advance Technology Attachment (SATA) bus, a Universal Serial Bus (USB) (including versions 1, 2, and 3), or a Universal Asynchronous Receiver/Transmitter (UART) bus. In at least one embodiment, FIG. 11 illustrates a system, which includes interconnected hardware devices or "chips," whereas in other embodiments, FIG. 11 can illustrate an exemplary System on a Chip (SoC). In at least one embodiment, devices illustrated in FIG. 11 can be interconnected with proprietary interconnects, standardized interconnects (e.g., PCIe), or some combination thereof. In at least one embodiment, one or more components of FIG. 11 are interconnected using compute express link (CXL) interconnects.

In at least one embodiment, FIG. 11 can include a display 1110, a touch screen 1112, a touch pad 1114, a Near Field Communications unit (NFC) 1138, a sensor hub 1126, a thermal sensor 1140, an Express Chipset (EC), such as EC 1116, a Trusted Platform Module (TPM), such as TPM 1120, BIOS/firmware(FW)/flash memory, such as BIOS, FW Flash 1108, a DSP 1154, a memory drive 1106 such as a Solid State Disk (SSD) or a Hard Disk Drive (HDD), a wireless local area network unit (WLAN), such as WLAN unit 1142, a Bluetooth unit 1144, a Wireless Wide Area Network unit (WWAN), such as WWAN unit 1150, a Global Positioning System (GPS) 1148, a camera (USB 3.0 camera) 1146, such as a USB 3.0 camera, and/or a Low Network bandwidth Double Data Rate (LPDDR) memory unit, such as LPD5 1104 implemented in, for example, LPDDR5 standard. These components can each be implemented in any suitable manner.

In at least one embodiment, other components can be communicatively coupled to processor 1102 through the components discussed above. In at least one embodiment, processor 1102 can include a network bandwidth-aware scheduling module 1130. In at least one embodiment, an accelerometer 1128, Ambient Light Sensor (ALS), such as ALS 1132, compass 1134, and a gyroscope 1136 can be communicatively coupled to sensor hub 1126. In at least one embodiment, thermal sensor 1140, a fan 1122, a keyboard 1118, and a touch pad 1114 can be communicatively coupled to EC 1116. In at least one embodiment, speakers 1158, headphones 1160, and microphone 1162 can be communicatively coupled to an audio unit 1156 which can, in turn, be communicatively coupled to DSP 1154. In at least one embodiment, audio unit 1156 can include, for example, and without limitation, an audio coder/decoder (codec) and a class-D amplifier. In at least one embodiment, a subscriber identification module (SIM) card, such as SIM 1152 can be communicatively coupled to WWAN unit 1150. In at least one embodiment, components such as WLAN unit 1142 and Bluetooth unit 1144, as well as WWAN unit 1150 can be implemented in a Next Generation Form Factor (NGFF).

Figure 12:
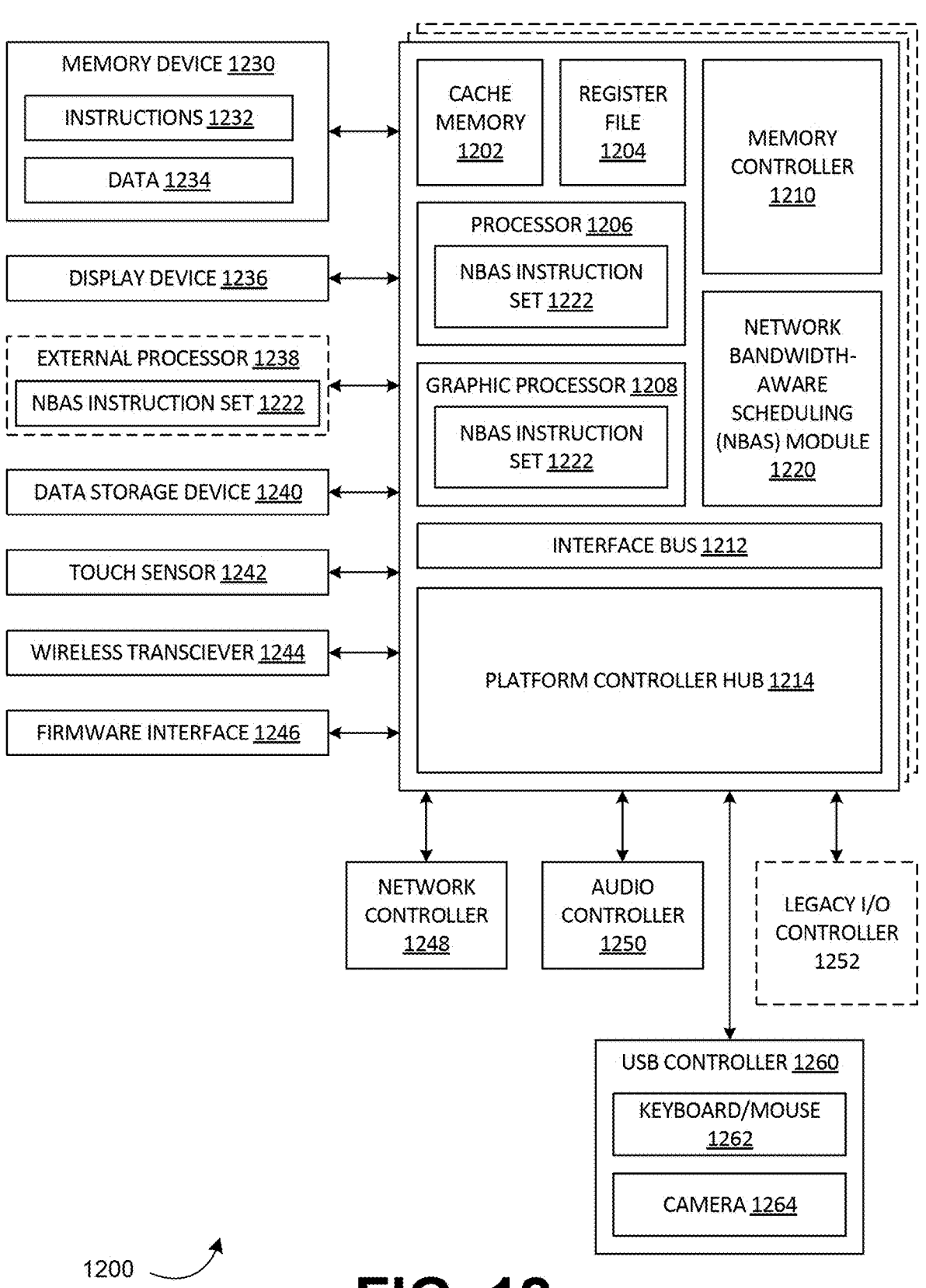
FIG. 12 is a block diagram of a processing system, according to aspects of the disclosure.

FIG. 12 is a block diagram of a processing system 1200, according to aspects of the disclosure. In at least one embodiment, the processing system 1200 includes cache memory 1202, register file 1204, processors 1206, graphics processors 1208, memory controller 1210, interface bus 1212, platform controller hub 1214, and network bandwidth-aware scheduling module 1220. Processing system 1200 can be a single processor desktop system, a multiprocessor workstation system, or a server system having a large number of processors 1206 or graphics processors 1208. In at least one embodiment, the processing system 1200 is a processing platform incorporated within a system-on-a-chip (SoC) integrated circuit for use in mobile, handheld, or embedded devices.

In at least one embodiment, the processing system 1200 can include, or be incorporated within a server-based gaming platform, a game console, including a game and media console, a mobile gaming console, a handheld game console, or an online game console. In at least one embodiment, the processing system 1200 is a mobile phone, smartphone, tablet computing device, or mobile Internet device. In at least one embodiment, the processing system 1200 can also include, couple with, or be integrated within, a wearable device, such as a smart watch wearable device, smart eyewear device, augmented reality device, or virtual reality device. In at least one embodiment, the processing system 1200 is a television or set-top box device having one or more processors 1206 and a graphical interface generated by one or more graphics processors 1208.

In at least one embodiment, one or more processors 1206 each include one or more of the processor cores to process instructions which, when executed, perform operations for system and user software. In at least one embodiment, one or more processors 1206 and/or one or more graphics processors can be configured to process a portion of the network bandwidth-aware scheduling (NBAS) instruction set, such as NBAS instruction set 1222. In at least one embodiment, NBAS instruction set 1222 can facilitate Complex Instruction Set Computing (CISC), Reduced Instruction Set Computing (RISC), or computing via a Very Long Instruction Word (VLIW). In at least one embodiment, processor cores can cach process a different instruction set from NBAS instruction set 1222, which can include instructions to facilitate emulation of other instruction sets (not illustrated). In at least one embodiment, processor cores can also include other processing devices, such as a Digital Signal Processor (DSP).

In at least one embodiment, processors 1206 includes cache memory 1202. In at least one embodiment, processors 1206 can have a single internal cache or multiple levels of internal cache. In at least one embodiment, cache memory 1202 is shared among various components of processors 1206. In at least one embodiment, processors 1206 also uses an external cache (e.g., a Level-3 (L3) cache or Last Level Cache (LLC)) (not illustrated), which can be shared among processor cores using known cache coherency techniques. In at least one embodiment, register file 1204 is additionally included in processors 1206, which can include different types of registers for storing different types of data (e.g., integer registers, floating-point registers, status registers, and an instruction pointer register). In at least one embodiment, register file 1204 can include general-purpose registers or other registers.

In at least one embodiment, one or more processors 1206 are coupled with one or more interface bus 1212 to transmit communication signals such as address, data, or control signals between processor cores and other components in processing system 1200. In at least one embodiment, interface bus 1212, in one embodiment, can be a processor bus, such as a version of a Direct Media Interface (DMI) bus. In at least one embodiment, interface bus 1212 is not limited to a DMI bus, and can include one or more Peripheral Component Interconnect buses (e.g., PCI, PCI Express), memory busses, or other types of interface busses. In at least one embodiment, processors 1206 include an integrated memory controller (e.g., memory controller 1210) and a platform controller hub 1214 (PCH). In at least one embodiment, memory controller 1210 facilitates communication between a memory device and other components of the processing system 1200, while platform controller hub 1214 provides connections to I/O devices via a local I/O bus.

In at least one embodiment, the memory device 1230 can be a dynamic random access memory (DRAM) device, a static random access memory (SRAM) device, a flash memory device, a phase-change memory device, or some other memory device having suitable performance to serve as process memory. In at least one embodiment, the memory device 1230 can operate as system memory for processing system 1200 to store instructions 1232 and data 1234 for use when one or more processors 1206 executes an application or process. In at least one embodiment, memory controller 1210 also optionally couples with an external processor 1238, which can communicate with one or more graphics processors 1208 in processors 1206 to perform graphics and media operations. In at least one embodiment, a display device 1236 can connect to processors 1206. In at least one embodiment, the display device 1236 can include one or more of an internal display device, as in a mobile electronic device or a laptop device, or an external display device attached via a display interface (e.g., DisplayPort, etc.). In at least one embodiment, display device 1236 can include a head-mounted display (HMD) such as a stereoscopic display device for use in virtual reality (VR) applications or augmented reality (AR) applications.

In at least one embodiment, the platform controller hub 1214 enables peripherals to connect to memory device 1230 and processors 1206 via a high-speed I/O bus. In at least one embodiment, I/O peripherals include, but are not limited to, a data storage device 1240 (e.g., hard disk drive, flash memory, etc.), a touch sensor 1242, a wireless transceiver 1244, firmware interface 1246, a network controller 1248, or an audio controller 1250.

In at least one embodiment, the data storage device 1240 can connect via a storage interface (e.g., SATA) or via a peripheral bus, such as a Peripheral Component Interconnect bus (e.g., PCI, PCI Express). In at least one embodiment, touch sensor 1242 can include touch screen sensors, pressure sensors, or fingerprint sensors. In at least one embodiment, wireless transceiver 1244 can be a Wi-Fi transceiver, a Bluetooth transceiver, or a mobile network transceiver such as a 3G, 4G, or Long Term Evolution (LTE) transceiver. In at least one embodiment, firmware interface 1246 enables communication with system firmware and can be, for example, a unified extensible firmware interface (UEFI). In at least one embodiment, the network controller 1248 can enable a network connection to a wired network. In at least one embodiment, a high-performance network controller (not illustrated) couples with interface bus 1212. In at least one embodiment, audio controller 1250 can be a multi-channel high-definition audio controller. In at least one embodiment, the processing system 1200 includes an optional legacy I/O controller 1252 for coupling legacy (e.g., Personal System 2 (PS/2)) devices to the processing system 1200. In at least one embodiment, the platform controller hub 1214 can also connect to one or more Universal Serial Bus (USB) controllers, such as USB controller 1260 to connect input devices, such as a keyboard and mouse combination (keyboard/mouse 1262), a camera 1264, or other USB input devices.

In at least one embodiment, an instance of memory controller 1210 and platform controller hub 1214 can be integrated into a discreet external graphics processor, such as external processor 1238. In at least one embodiment, the platform controller hub 1214 and/or memory controller 1210 can be external to one or more processors 1206. For example, in at least one embodiment, the processing system 1200 can include an external memory controller (e.g., memory controller 1210) and the platform controller hub 1214, which can be configured as a memory controller hub and peripheral controller hub within a system chipset that is in communication with the processors 1206.

Other variations are within the spirit of the present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. The term "connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. Use of the term "set" (e.g., "a set of items") or "subset," unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and corresponding set can be equal.

Conjunctive language, such as phrases of the form "at least one of A, B, and C," or "at least one of A, B, and C," unless specifically stated otherwise or otherwise clearly contradicted by context, is otherwise understood with the context as used in general to present that an item, term, etc., can be either A or B or C, or any nonempty subset of a set of A and B and C. For instance, in an illustrative example of a set having three members, conjunctive phrases "at least one of A, B, and C" and "at least one of A, B, and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, the term "plurality" indicates a state of being plural (e.g., "a plurality of items" indicates multiple items). A plurality is at least two items but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lacks all of the code while multiple non-transitory computer-readable storage media collectively store all of the code. In at least one embodiment, executable instructions are executed such that different instructions are executed by different processors—for example, a non-transitory computer-readable storage medium stores instructions, and a main central processing unit (CPU) executes some of the instructions while a graphics processing unit (GPU) executes other instructions. In at least one embodiment, different components of a computer system have separate processors, and different processors execute different subsets of instructions.

Accordingly, in at least one embodiment, computer systems are configured to implement one or more services that singly or collectively perform operations of processes described herein, and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples or exemplary language (e.g., "such as") provided herein is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, the terms "coupled" and "connected," along with their derivatives, can be used. It should be understood that these terms cannot be intended as synonyms for each other. Rather, in particular examples, "connected" or "coupled" can be used to indicate that two or more elements are in direct or indirect physical or electrical contact with each other. "Coupled" can also mean that two or more elements are not in direct contact with each other but yet still co-operate or interact with each other.

Unless specifically stated otherwise, it can be appreciated that throughout specification terms such as "processing," "computing," "calculating," "determining," or like, refer to action and/or processes of a computer or computing system or similar electronic computing device, that manipulates and/or transform data represented as physical, such as electronic, quantities within computing system's registers and/or memories into other data similarly represented as physical quantities within computing system's memories, registers or other such information storage, transmission or display devices.

In a similar manner, the term "processor" can refer to any device or portion of a device that processes electronic data from registers and/or memory and transform that electronic data into other electronic data that can be stored in registers and/or memory. As non-limiting examples, a "processor" can be a CPU or a GPU. A "computing platform" can comprise one or more processors. As used herein, "software" processes can include, for example, software and/or hardware entities that perform work over time, such as tasks, threads, and intelligent agents. Also, each process can refer to multiple processes for carrying out instructions in sequence or in parallel, continuously, or intermittently. The terms "system" and "method" are used herein interchangeably insofar as a system can embody one or more methods, and methods can be considered a system.

In the present document, references can be made to obtaining, acquiring, receiving, or inputting analog or digital data into a subsystem, computer system, or computer-implemented machine. Obtaining, acquiring, receiving, or inputting analog and digital data can be accomplished in a variety of ways, such as by receiving data as a parameter of a function call or a call to an application programming interface. In some implementations, the process of obtaining, acquiring, receiving, or inputting analog or digital data can be accomplished by transferring data via a serial or parallel interface. In another implementation, the process of obtaining, acquiring, receiving, or inputting analog or digital data can be accomplished by transferring data via a computer network from providing entity to acquiring entity. References can also be made to providing, outputting, transmitting, sending, or presenting analog or digital data. In various examples, the process of providing, outputting, transmitting, sending, or presenting analog or digital data can be accomplished by transferring data as an input or output parameter of a function call, a parameter of an application programming interface, or an interprocess communication mechanism.

Although the discussion above sets forth example implementations of described techniques, other architectures can be used to implement described functionality and are intended to be within the scope of this disclosure. Furthermore, although specific distributions of responsibilities are defined above for purposes of discussion, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:
receiving, at a data center scheduler, a request to perform a first set of processes;
determining, using one or more processors of the data center scheduler, an expected network bandwidth usage value for the first set of processes;
determining, for each server racks of a plurality of server racks of a data center, an available network bandwidth value;
selecting, from the plurality of server racks, a first server rack having a first available network bandwidth value closest to the expected network bandwidth usage value, the first server rack comprising a first set of servers;
determining that a first server of the first set of servers has hardware component resources available for the first set of processes; and
responsive to determining that the first server has hardware component resources available, assigning the first set of processes to the first server of the first server rack.

2. The method of claim 1, wherein determining the expected network bandwidth usage value comprises:
determining that the first set of processes have previously been performed;
obtaining from a data store, one or more historical network bandwidth usage values corresponding to the first set of processes; and
predicting the expected network bandwidth usage value based on the one or more historical network bandwidth usage values.

3. The method of claim 2, further comprising:
receiving an indication that the first set of processes have been performed; and
storing an actual network bandwidth usage value corresponding to the first set of processes to the data store as a first historical network bandwidth usage value.

4. The method of claim 2, wherein predicting the expected network bandwidth usage value comprises:
determining, using a machine learning (ML) model, the expected network bandwidth usage value, wherein the ML model is trained using at least one historical network bandwidth usage value of the one or more historical network bandwidth usage values.

5. The method of claim 4, wherein the ML model is at least one of a random forest regression model or a support vector machine (SVM) model.

6. The method of claim 1, wherein selecting the first server rack from the plurality of server racks further comprises:
obtaining a power consumption value for the first set of processes;
obtaining a real-time power usage value for the first server rack;
determining that a first sum of the real-time power usage value and the power consumption value does not exceed a threshold value representing a maximum power value of the first server rack; and
indicating that the first set of processes are allowed to be assigned to the first server of the first set of servers.

7. The method of claim 1, wherein determining that the first server has hardware component resources available comprises:
obtaining expected usage metrics corresponding to the first set of processes;
obtaining real-time usage metrics of hardware components of the first server;
determining that a first aggregation of the real-time usage metrics and the expected usage metrics do not exceed a threshold value representing a maximum usage metric associated with the hardware components of the first server; and
indicating that the first set of processes are allowed to be assigned to servers of the first set of servers.

8. The method of claim 1, further comprising:
receiving, at the data center scheduler, another request to perform a second set of processes;
determining that the first server is not available;
determining that a second server of the first set of servers is available; and
responsive to determining that the second server is available, assigning the second set of processes to the second server.

9. The method of claim 1, further comprising:
receiving, at the data center scheduler, another request to perform a second set of processes;
determining the first server is not available;
selecting, from the plurality of server racks, a second server rack having a second available network bandwidth value, wherein the second available network bandwidth value is closest to an expected network bandwidth usage value for the second set of processes, the second server rack comprising a second set of servers;
determining that a third server of the second set of servers is available; and
responsive to determining that the third server is available, assigning the second set of processes to the third server.

10. A processor device comprising:

one or more processing units of a data center scheduler to receive a request to perform a set of processes, determine an expected network bandwidth usage value for the set of processes, determine an available network bandwidth value for each server rack of a plurality of server racks of a data center, select a first server rack having a first available network bandwidth value closest to the expected network bandwidth usage value from the one or more of server racks, and assign the set of processes to a first server of a first set of servers of the first server rack responsive to determining that the first server has hardware component resources available for the set of processes.

11. The processor device of claim 10, wherein to determine the expected network bandwidth usage value, the one or more processing units are to:

obtain from a data store and responsive to determining that the set of processes have previously been performed, one or more historical network bandwidth usage values corresponding to the set of processes; and predict the expected network bandwidth usage value based on the one or more historical network bandwidth usage values.

12. The processor device of claim 11, wherein the one or more processing units are further to:

store, responsive to an indication that the set of processes have been performed, an actual network bandwidth usage value corresponding to the set of processes to the data store as a first historical network bandwidth usage value.

13. The processor device of claim 11, wherein to predict the expected network bandwidth usage value, the one or more processing units are to:

determine the expected network bandwidth usage value using a machine learning (ML) model, wherein the ML model is trained using at least one of the one or more historical network bandwidth usage values.

14. The processor device of claim 13, wherein the ML model is at least one of a random forest regression model or a support vector machine (SVM) model.

15. A system comprising:

a memory device; and a processor device coupled to the memory device, wherein the processor device is to:

receive a request to perform a first set of processes;

determine an expected network bandwidth usage value for the first set of processes;

determine, for each server rack of a plurality of server racks of a data center, an available network bandwidth value;

select from the plurality of server racks, a first server rack having a first available network bandwidth value closest to the expected network bandwidth usage value, the first server rack having a first set of servers;

determine that a first server of the first set of servers has hardware component resources available for the first set of processes; and responsive to determining that the first server of the first set of servers has hardware component resources available, assign the first set of processes to the first server.

16. The system of claim 15, wherein selecting the first server rack from the plurality of server racks, the processor device is further to:

obtain a power consumption value for the first set of processes;

obtain a real-time power usage value for the first server rack; and determining that a first sum of the real-time power usage value and the power consumption value does not exceed a threshold value representing a maximum power value of the first server rack, indicate the first set of processes can be assigned to servers of the first set of servers.

17. The system of claim 15, wherein to determine that the first server is available, the processor device is to:

obtain expected usage metrics corresponding to the first set of processes;

obtain real-time usage metrics of hardware components of the first server; and determining that a first aggregation of the real-time usage metrics and the expected usage metrics do not exceed a threshold value representing a maximum usage metric associated with the hardware components of the first server, indicating that the first set of processes are allowed to be assigned to servers of the first set of servers.

18. The system of claim 15, the processor device further to:

select, from the plurality of server racks and responsive to determining that the first server is not available, a second server rack having a second available network bandwidth value, wherein the second available network bandwidth value is next-closest to the expected network bandwidth usage value, the second server rack comprising a second set of servers;

determine that a second server of the second set of servers is available; and responsive to determining that the second server is available, assign the first set of processes to the second server.

19. The system of claim 15, wherein the system comprises one or more of:

a control system for an autonomous or semi-autonomous machine;

a perception system for an autonomous or semi-autonomous machine;

a system for performing simulation operations;

a system for performing deep learning operations;

a system for generating synthetic data;

a system for generating multi-dimensional assets using a collaborative content platform;

a system implemented using an edge device;

a system implemented using a robot;

a system incorporating one or more virtual machines (VMs);

a system implemented at least partially in a data center; or a system implemented at least partially using cloud computing resources.

* * * * *